(12) United States Patent
Lee et al.

(10) Patent No.: US 12,356,462 B2
(45) Date of Patent: Jul. 8, 2025

(54) METHOD FOR TRANSMITTING/RECEIVING SIGNAL IN WIRELESS COMMUNICATION SYSTEM AND APPARATUS SUPPORTING SAME

(71) Applicant: LG ELECTRONICS INC., Seoul (KR)

(72) Inventors: Jeongsu Lee, Seoul (KR); Hyunsu Cha, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 17/914,673

(22) PCT Filed: Mar. 25, 2021

(86) PCT No.: PCT/KR2021/003698
§ 371 (c)(1),
(2) Date: Sep. 26, 2022

(87) PCT Pub. No.: WO2021/194274
PCT Pub. Date: Sep. 30, 2021

(65) Prior Publication Data
US 2023/0127817 A1    Apr. 27, 2023

(30) Foreign Application Priority Data

Mar. 25, 2020 (KR) .................. 10-2020-0036158
Aug. 7, 2020 (KR) .................. 10-2020-0099074

(51) Int. Cl.
*H04W 74/0833*    (2024.01)
*G01S 13/76*    (2006.01)
*H04W 4/029*    (2018.01)

(52) U.S. Cl.
CPC ....... *H04W 74/0833* (2013.01); *G01S 13/765* (2013.01); *H04W 4/029* (2018.02)

(58) Field of Classification Search
CPC ..... H04W 74/083; H04W 4/02; H04W 4/029; H04W 4/20; G01S 13/76; G01S 13/765; G01S 19/42; G01S 115/874
See application file for complete search history.

(56) References Cited

U.S. PATENT DOCUMENTS

2011/0190005 A1* 8/2011 Cheon ................. H04W 64/003
                                                          455/456.1
2016/0353440 A1* 12/2016 Lee .................... H04W 74/0833
(Continued)

FOREIGN PATENT DOCUMENTS

WO      2013039435        3/2013
WO   WO-2022031457 A1 *  2/2022 ............... H04L 5/00

OTHER PUBLICATIONS

InterDigital, "2-Step RACH Procedure," 3GPP TSG-RAN WG2 Meeting #103bis, R2-1814008, Sep. 2018, 7 pages.
(Continued)

*Primary Examiner* — Warner Wong
(74) *Attorney, Agent, or Firm* — LEE, HONG, DEGERMAN, KANG & WAIMEY

(57) ABSTRACT

Various embodiments relate to a next generation wireless communication system for supporting a higher data transfer rate and the like beyond the 4th generation (4G) wireless communication system. According to various embodiments, a method for transmitting/receiving a signal in a wireless communication system and an apparatus supporting same may be provided, and various other embodiments may also be provided.

11 Claims, 26 Drawing Sheets

(56) References Cited

U.S. PATENT DOCUMENTS

| | | | | |
|---|---|---|---|---|
| 2016/0362794 | A1* | 12/2016 | Fujita | C23C 22/66 |
| 2018/0139785 | A1 | 5/2018 | Zhang et al. | |
| 2018/0270867 | A1 | 9/2018 | Yi et al. | |
| 2019/0342874 | A1* | 11/2019 | Davydov | H04W 72/23 |
| 2020/0059967 | A1* | 2/2020 | Kim | H04L 1/0026 |
| 2020/0110085 | A1* | 4/2020 | Weaver | A61B 5/055 |
| 2020/0396744 | A1* | 12/2020 | Xiong | H04B 7/088 |
| 2022/0095388 | A1* | 3/2022 | Sosnin | H04W 74/0866 |
| 2022/0110161 | A1* | 4/2022 | Christoffersson | H04W 74/0833 |
| 2022/0167424 | A1* | 5/2022 | Zhang | H04W 52/16 |
| 2022/0361027 | A1* | 11/2022 | Siomina | H04W 24/08 |
| 2023/0308995 | A1* | 9/2023 | Siomina | H04W 64/006 |
| 2024/0430716 | A1* | 12/2024 | Harada | H04W 24/08 |

OTHER PUBLICATIONS

Ericsson, "Running CR for the introduction of NR positioning," 3GPP TSG-RAN WG2 Meeting #109-e, R2-2002247, Mar. 2020, e-Meeting, 528 pages.

PCT International Application No. PCT/KR2021/003698, International Search Report dated Jul. 15, 2021, 3 pages.

\* cited by examiner (a)

(b)

(a)

(b)

METHOD FOR TRANSMITTING/RECEIVING SIGNAL IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2021/003698, filed on Mar. 25, 2021, which claims the benefit of earlier filing date and right of priority to Korean Application No. 10-2020-0036158, filed Mar. 25, 2020, and 10-2020-0099074, filed on Aug. 7, 2020, the contents of which are all incorporated by reference herein in their entirety.

TECHNICAL FIELD

Various embodiments are related to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a method for triggering a positioning measurement operation for a terminal in a wireless communication system and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method and apparatus for transmitting and receiving a signal in a wireless communication system.

According to various embodiments, a method carried out by an apparatus in a wireless communication system may be provided.

According to various embodiments, the method may include: obtaining a message including a physical random access channel (PRACH) preamble and a physical uplink shared channel (PUSCH); and transmitting the message.

According to various embodiments, the PRACH preamble may be included in one or more PRACH preambles configured for positioning.

According to various embodiments, the one or more PRACH preambles may be a plurality of PRACH preambles configured for the positioning.

According to various embodiments, the plurality of PRACH preambles may be distributed into a plurality of groups.

According to various embodiments, the plurality of groups may be respectively related to different information elements (IEs) for a long-term evolution positioning protocol (LPP) message for the positioning.

According to various embodiments, the IEs may include: (i) a first IE related to an LPP capability of the apparatus; (ii) a second IE related to requesting assistance data for the positioning; and (iii) a third IE related to providing one or more measurements for the positioning.

According to various embodiments, the apparatus may be in a radio resource control (RRC) idle or RRC inactive state.

According to various embodiments, based on the PRACH preamble being included in a group related to the third IE among the plurality of groups, the PUSCH may include information related to the one or more measurements.

According to various embodiments, the information related to the one or more measurements may include information based on a reporting range defined by first resolution preconfigured for the RRC idle or RRC inactive state within a predetermined range.

According to various embodiments, the first resolution may be greater than second resolution preconfigured for an RRC connected state.

According to various embodiments, information related to a number of total PRACH preambles available for a contention-based random access procedure and a contention-free random access procedure may be received.

According to various embodiments, at least one of the following may be satisfied: (i) based on reception of information related to a number of one or more PRACH preambles configured for the positioning among the total PRACH preambles, obtaining as many PRACH preambles as the number of the one or more PRACH preambles configured for the positioning among the total PRACH preambles as the one or more PRACH preambles; or (ii) based on reception of information related to a number of one or more PRACH preambles configured for the positioning among PRACH preambles available for other purposes except for the total PRACH preambles, obtaining as many PRACH preambles as the number of the one or more PRACH preambles configured for the positioning among the PRACH preambles available for the other purposes as the one or more PRACH preambles.

According to various embodiments, the method may further include: monitoring a positioning reference signal (PRS) related to the positioning within a time duration configured based on system information.

According to various embodiments, based on failure in monitoring the PRS within the time duration, the PRACH preamble may be retransmitted.

According to various embodiments, the PRACH preamble may be transmitted on one or more PRACH occasions among a plurality of PRACH occasions.

According to various embodiments, the PUSCH may be transmitted on one or more PUSCH occasions among a plurality of PUSCH occasions.

According to various embodiments, the one or more PUSCH occasions may be located after the one or more PRACH occasions in a time domain.

According to various embodiments, based on the PRS being monitored between the one or more PRACH occasions and the one or more PUSCH occasions in the time domain, the PUSCH may include information related to one or more measurements for the positioning based on the PRS.

According to various embodiments, a terminal operating in a wireless communication system may be provided.

According to various embodiments, the terminal may include a transceiver, and one or more processors connected to the transceiver.

According to various embodiments, the one or more processors may be configured to obtain a message including a PRACH preamble and a PUSCH; and transmit the message.

According to various embodiments, the PRACH preamble may be included in one or more PRACH preambles configured for positioning.

According to various embodiments, the one or more PRACH preambles may be a plurality of PRACH preambles configured for the positioning.

According to various embodiments, the plurality of PRACH preambles may be distributed into a plurality of groups.

According to various embodiments, the plurality of groups may be respectively related to different IEs for a LPP message for the positioning.

According to various embodiments, the IEs may include: (i) a first IE related to an LPP capability of the apparatus; (ii) a second IE related to requesting assistance data for the positioning; and (iii) a third IE related to providing one or more measurements for the positioning.

According to various embodiments, the one or more processors may be configured to communicate with at least one of a mobile terminal, a network, or an autonomous driving vehicle other than a vehicle including the terminal.

According to various embodiments, a method carried out by an apparatus in a wireless communication system may be provided.

According to various embodiments, the method may include: receiving a message including a PRACH preamble and a PUSCH; and obtaining the PRACH preamble and the PUSCH based on the message.

According to various embodiments, the PRACH preamble may be included in one or more PRACH preambles configured for positioning.

According to various embodiments, a base station operating in a wireless communication system may be provided.

According to various embodiments, the base station may include a transceiver, and one or more processors connected to the transceiver.

According to various embodiments, the one or more processors may be configured to: receive a message including a PRACH preamble and a PUSCH; and obtain the PRACH preamble and the PUSCH based on the message.

According to various embodiments, the PRACH preamble may be included in one or more PRACH preambles configured for positioning.

According to various embodiments, an apparatus operating in a wireless communication system may be provided.

According to various embodiments, the apparatus may include one or more processors, and one or more memories storing one or more instructions to cause the one or more processors to carry out a method.

According to various embodiments, the method may include: obtaining a message including a PRACH preamble and a PUSCH; and transmitting the message.

According to various embodiments, the PRACH preamble may be included in one or more PRACH preambles configured for positioning.

According to various embodiments, a processor-readable medium storing one or more instructions to cause one or more processors to carry out a method may be provided.

According to various embodiments, the method may include: obtaining a message including a PRACH preamble and a PUSCH; and transmitting the message.

According to various embodiments, the PRACH preamble may be included in one or more PRACH preambles configured for positioning.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

Advantageous Effects

According to various embodiments, a signal may be effectively transmitted and received in a wireless communication system.

According to various embodiments, positioning may be effectively performed in a wireless communication system.

According to various embodiments, positioning may be effectively performed in a wireless communication system.

According to various embodiments, a triggering method for a positioning measurement operation for an RRC-connected terminal as well as an RRC idle/inactive terminal may be provided.

According to various embodiments, a positioning measurement operation for an RRC connected terminal as well as an RRC idle/inactive terminal may be provided without ambiguity.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the various embodiments. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
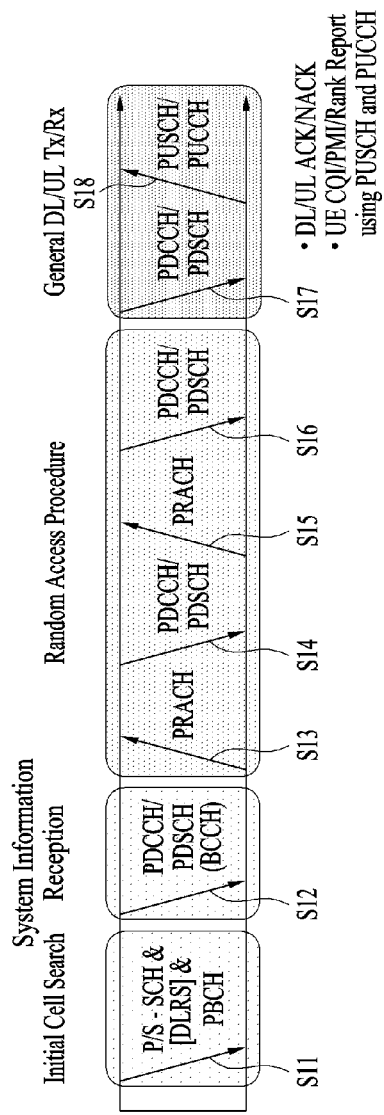
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
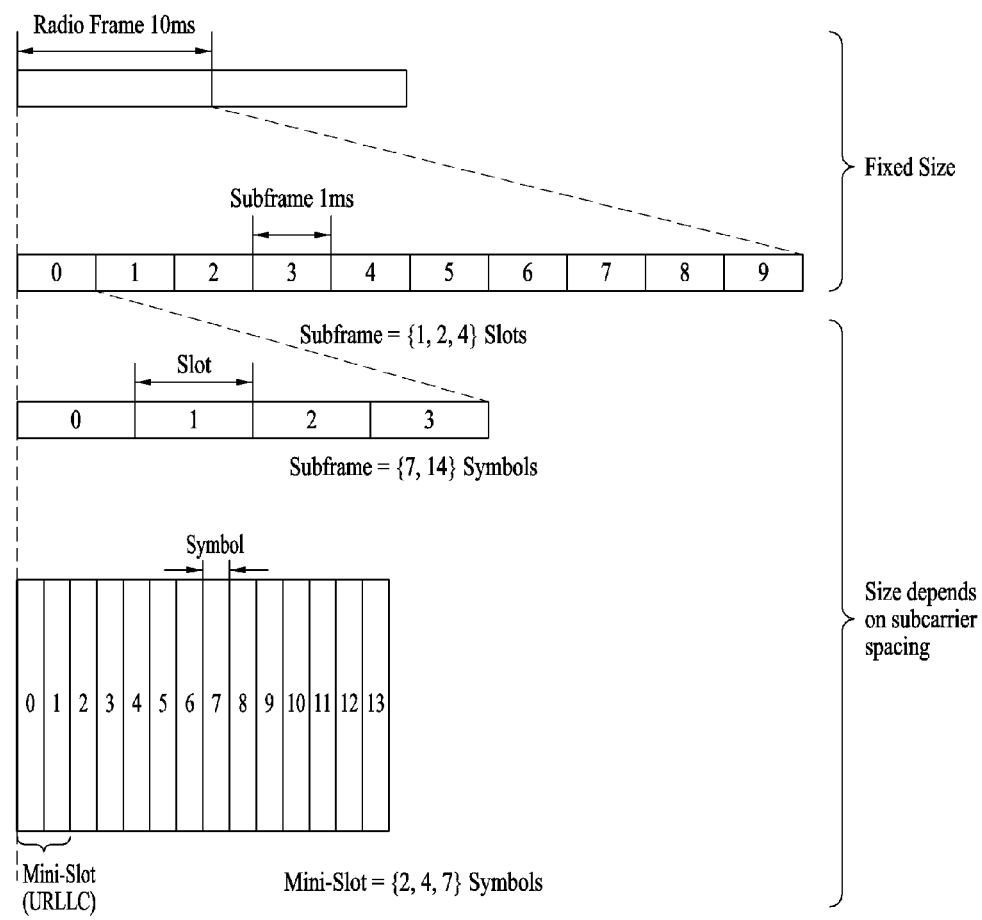
FIG. 2 is a diagram illustrating a radio frame structure in a new radio access technology (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), μ and a CP are obtained from RRC parameters provided by the BS.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with µ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi-co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
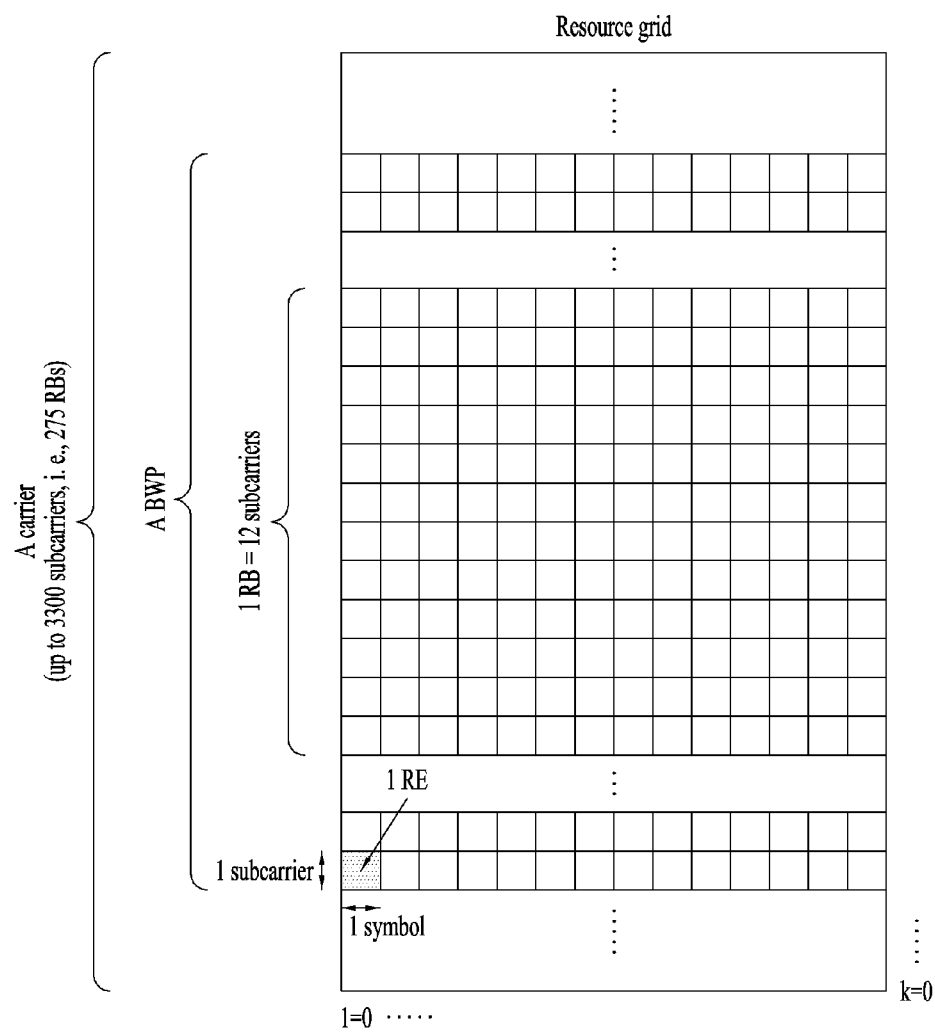
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as $14 \times 2^\mu$ OFDM symbols by $N_{grid}^{size,\mu} \times N_{SC}^{RB}$ subcarriers, where $N_{grid}^{size,\mu}$ is indicated by RRC signaling from the BS. $N_{grid}^{size,\mu}$ may vary according to an SCS configuration µ and a transmission direction, UL or DL. There is one resource grid for an SCS configuration µ, an antenna port p, and a transmission direction (UL or DL). Each element of the resource grid for the SCS configuration µ and the antenna port p is referred to as an RE and uniquely identified by an index pair (k, l) where k represents an index in the frequency domain, and l represents a symbol position in the frequency domain relative to a reference point. The RE (k, l) for the SCS configuration µ and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
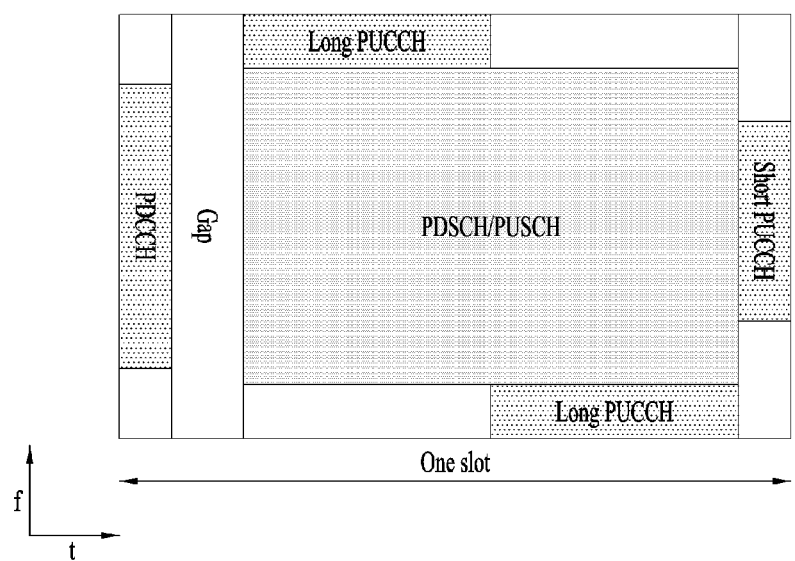
FIG. 4 is a diagram illustrating mapping of physical channels in a slot, to which various embodiments are applicable.
Figure 5:
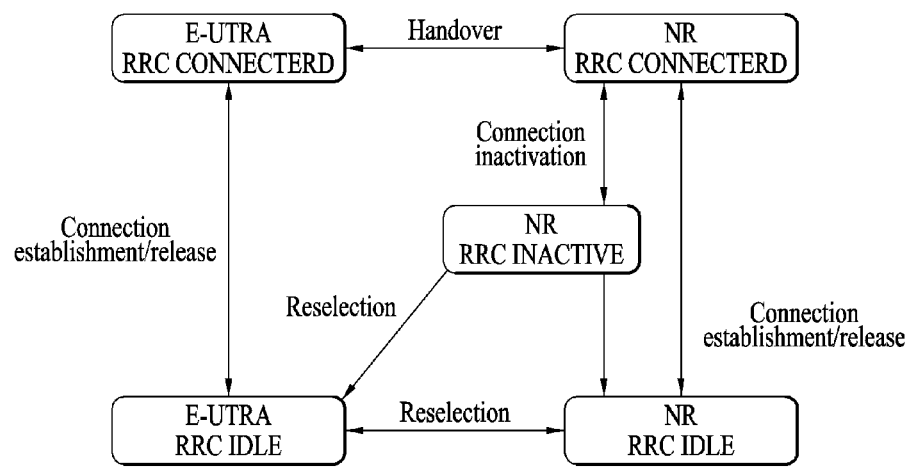
FIG. 5 is a diagram illustrating radio resource control (RRC) states, RRC state transition, and a mobility procedure supported between an NR/next generation core (NGC) and an evolved-universal terrestrial radio access network/evolved packet core (E-UTRAN/EPC), to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.3. Radio Resource Control (RRC) States

FIG. 4 is a diagram illustrating RRC states, RRC state transition, and a mobility procedure supported between an NR/next generation core (NGC) and an evolved-universal terrestrial radio access network/evolved packet core (E-UTRAN/EPC), to which various embodiments are applicable.

The UE has only one RRC state at a specific time. The RRC state indicates whether the RRC layer of the UE is logically connected to the layer of the NG radio access network (RAN). When an RRC connection has been established, the UE may be in an RRC_CONNECTED state or an RRC_INACTIVE state. When the RRC connection has not been established, the UE is in an RRC-IDLE state.

In the RRC_CONNECTED state or the RRC_INACTIVE state, the UE has an RRC connection, and accordingly, the NG RAN may recognize the existence of the UE on a cell basis. On the other hand, in the RRC_IDLE state, the UE may not be recognized by the NG RAN and is managed by a core network on a tracking area basis. A tracking area is a unit wider than a cell.

When a user initially turns on the UE, the UE searches for an appropriate cell and maintains the RRC_IDLE state in the cell. Only when the RRC_IDLE-state UE needs to establish an RRC connection, the RRC_IDLE-state UE establishes the RRC connection with the NG RAN in an RRC connection procedure, and transitions to the RRC_CONNECTED state or the RRC_INACTIVE state.

The RRC states of the UE have the following features.

(1) RRC_IDLE State

The UE may be configured with discontinuous reception (DRX) by a higher layer.

The mobility of the UE is controlled based on a network configuration.

The UE monitors a paging channel.

The UE performs neighbor cell measurement and cell (re)selection.

The UE acquires system information.

(2) RRC_INACTIVE State

The UE may be configured with DRX by the higher layer or RRC layer.

The mobility of the UE is controlled based on a network configuration.

The UE stores an access stratum (AS) context.

The UE monitors a paging channel.

The UE performs neighbor cell measurement and cell (re)selection.

When the UE moves outside a RAN-based notification area, the UE performs RAN-based notification area update.

The UE acquires system information.

(3) RRC_CONNECTED State

The UE stores an AS context.

The UE transmits and receives unicast data.

At a lower layer, the UE may be configured with UE-specific DRX.

A UE supporting carrier aggregation (CA) may use one or more secondary cells (SCells) aggregated with a special cell (SpCell), for an increased bandwidth.

A UE supporting dual connectivity (DC) may use a secondary cell group (SCG) aggregated with a master cell group (MCG), for an increased bandwidth.

The UE monitors a paging channel.

When data is scheduled for the UE, the UE monitors a control channel associated with a shared data channel.

The UE provides channel quality and feedback information.

The UE performs neighbor cell measurement and cell (re)selection.

The UE acquires system information.

Particularly, the RRC_IDLE or RRC_INACTIVE UE may operate as described in Table 5 below.

TABLE 5

| | UE procedure |
|---|---|
| $1^{st}$ step | a public land mobile network (PLMN) selection when a UE is switched on |
| $2^{nd}$ Step | cell (re)selection for searching a suitable cell |
| $3^{rd}$ Step | tune to its control channel (camping on the cell) |
| $4^{th}$ Step | Location registration and a RAN-based Notification Area (RNA) update |

1.4 Random Access (RACH) Procedure

When a UE initially accesses a BS or has no radio resources for signal transmission, the UE may perform a random access procedure with the BS.

The random access procedure is used for various purposes. For example, the random access procedure may be used for initial network access in the RRC_IDLE state, an RRC connection reestablishment procedure, handover, UE-triggered UL data transmission, transition from the RRC_INACTIVE state, time alignment establishment in SCell addition, other system information (OSI) request, and beam failure recovery. The UE may acquire UL synchronization and UL transmission resources in the random access procedure.

Random access procedures may be classified into a contention-based random access procedure and a contention-free random access procedure. The contention-based random access procedure is further branched into a 4-step random access (RACH) procedure and a 2-step random access (RACH) procedure.

4-Step RACH: Type-1 Random Access Procedure

Figure 6:
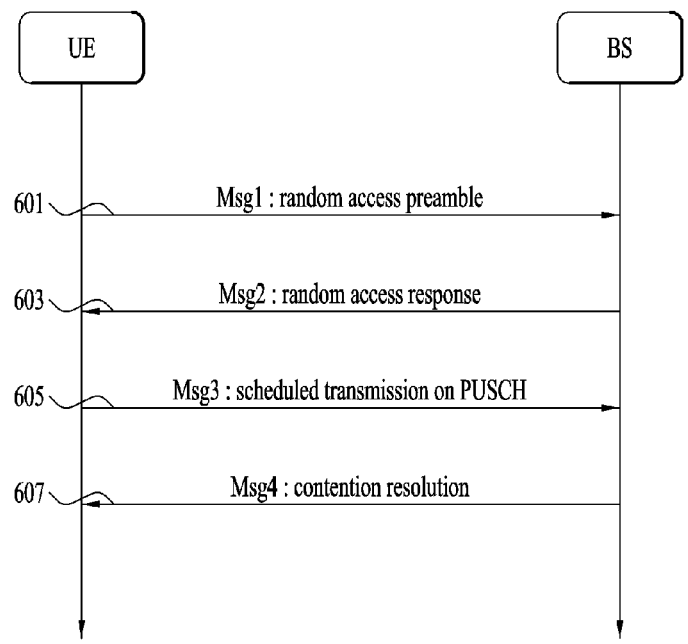
FIG. 6 is a diagram illustrating a 4-step random access channel (RACH) procedure to which various embodiments are applicable.
Figure 6:
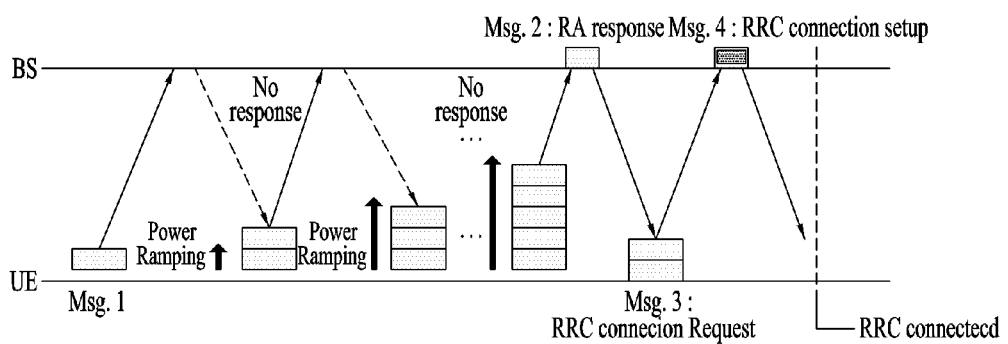

FIG. 6 is a diagram illustrating an exemplary 4-step RACH procedure to which various embodiments are applicable.

When the (contention-based) random access procedure is performed in four steps (4-step RACH procedure), the UE may transmit a message (Message 1 or Msg1) including a preamble related to a specific sequence on a physical random access channel (PRACH) (601) and receive a PDCCH and a response message (random access response (RAR) message) (Message 2 or Msg2) for the preamble on a PDSCH corresponding to the PDCCH (603). The UE transmits a message (Message 3 or Msg3) including a PUSCH based on scheduling information included in the RAR (605) and perform a contention resolution procedure involving reception of a PDCCH signal and a PDSCH signal corresponding to the PDCCH signal. The UE may receive a message (Message 4 or Msg4) including contention resolution information for the contention resolution procedure from the BS (607).

The 4-step RACH procedure of the UE may be summarized in Table 6 below.

TABLE 6

| | Type of Signals | Operations/Information obtained |
|---|---|---|
| $1^{st}$ step | PRACH preamble in UL | Initial beam obtainment Random selection of RA-preamble ID |
| $2^{nd}$ step | Random Access Response on DL-SCH | Timing Advanced information RA-preamble ID Initial UL grant, Temporary C-RNTI |
| $3^{rd}$ step | UL transmission on UL-SCH | RRC connection request UE identifier |
| $4^{th}$ step | Contention Resolution on DL | Temporary C-RNTI on PDCCH for initial access C-RNTI on PDCCH for UE in RRC_CONNECTED |

In a random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 kHz.

Multiple preamble formats are defined by one or more RACH OFDM symbols and different cyclic prefixes (CPs) (and/or guard times). An RACH configuration for the initial bandwidth of a primary cell (PCell) is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit the RACH preamble in RACH resources associated with the selected SSB. For example, when retransmitting the RACH preamble, the UE may reselect one of the SSBs and retransmit the RACH preamble in RACH resources associated with the reselected SSB. That is, the RACH resources for the retransmission of the RACH preamble may be identical to and/or different from the RACH resources for the transmission of the RACH preamble.

Upon receipt of the RACH preamble from the UE, the BS transmits an RAR message (Msg2) to the UE. A PDCCH that schedules a PDSCH carrying the RAR is cyclic redundancy check (CRC)-masked by a random access radio network temporary identifier (RA-RNTI) and transmitted.

Upon detection of the PDCCH masked by the RA-RNTI, the UE may receive the RAR on the PDSCH scheduled by DCI carried on the PDCCH. The UE determines whether the RAR includes RAR information for its transmitted preamble, that is, Msg1. The UE may make the determination by checking the presence or absence of the RACH preamble ID of its transmitted preamble in the RAR. In the absence of the response to Msg1, the UE may retransmit the RACH preamble a predetermined number of or fewer times, while performing power ramping. The UE calculates PRACH transmission power for the preamble retransmission based on the latest transmission power, a power increment, and a power ramping counter.

The RAR information may include the preamble sequence transmitted by the UE, a temporary cell RNTI (TC-RNTI) that the BS has allocated to the UE attempting random access, UL transmit time alignment information, UL transmission power adjustment information, and UL radio resource allocation information. Upon receipt of its RAR information on a PDSCH, the UE may acquire time advance information for UL synchronization, an initial UL grant, and a TC-RNTI. The timing advance information is used to control a UL signal transmission timing. For better alignment between a PUSCH/PUCCH transmission of the UE and a subframe timing of a network end, the network (e.g., the BS) may acquire timing advance information based on timing information detected from the PRACH preamble received from the UE and transmit the timing advance information. The UE may transmit a UL signal as Msg3 of the random access procedure on a UL-SCH based on the RAR information. Msg3 may include an RRC connection request and a UE ID. The network may transmit Msg4 in response to Msg3. Msg4 may be handled as a contention resolution message on DL. As the UE receives Msg4, the UE may enter the RRC_CONNECTED state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant start from the MSB and ends in the LSB, given as Table 7.

TABLE 7

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 2 |
| CSI request | 1 |

A transmit power control (TPC) command is used to determine the transmission power of the Msg3 PUSCH. For example, the TPC command is interpreted according to Table 8.

TABLE 8

| TPC command | value [dB] |
|---|---|
| 0 | −6 |
| 1 | −4 |
| 2 | −2 |
| 3 | 0 |

TABLE 8-continued

| TPC command | value [dB] |
|---|---|
| 4 | 2 |
| 5 | 4 |
| 6 | 6 |
| 7 | 8 |

2-Step RACH: Type-2 Random Access Procedure

Figure 7:
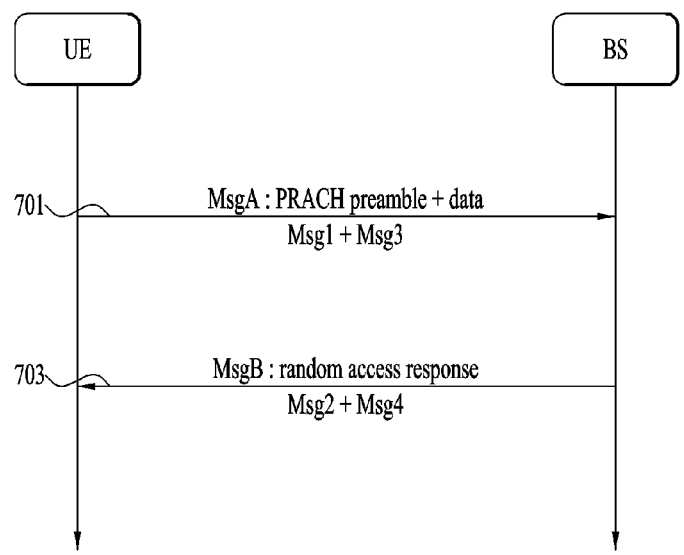
FIG. 7 is a diagram illustrating a 2-step RACH procedure to which various embodiments are applicable.

FIG. 7 is a diagram illustrating an exemplary 2-step RACH procedure to which various embodiments are applicable.

A (contention-based) RACH procedure performed in two steps, that is, a 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (701).

Further, in the 2-step RACH procedure, the BS may combine Msg2 and Msg4 of the 4-step RACH procedure into one message (e.g., MsgB) and transmit the message to the UE (703).

The 2-step RACH procedure may become a low-latency RACH procedure based on the combinations of these messages.

More specifically, MsgA may carry the PRACH preamble included in Msg1 and the data included in Msg3 in the 2-step RACH procedure. In the 2-step RACH procedure, MsgB may carry the RAR included in Msg2 and the contention resolution information included in Msg4.

Time domain resource allocation for a PUSCH included in MsgA (i.e., MsgA PUSCH) may be defined as follows.

When the UE transmits the MsgA PUSCH in a non-initial UL BWP, if the UE is configured with startSymbolAndLengthMsgAPO, the UE may determine S (start symbol) and L (allocation length) from startSymbolAndLengthMsgAPO.

When transmitting the MsgA PUSCH, if the UE is not configured with startSymbolAndLengthMsgAPO and if PUSCH-TimeDomainResourceAllocationList (TDRA) is provided in PUSCH-ConfigCommon, the UE may use msgA-timeDomainAllocation to indicate values in used the list. If PUSCH-TimeDomainResourceAllocationList is not provided in PUSCH-ConfigCommon, the UE may use S (start symbol) and L (allocation length) from Table 9 (default PUSCH time domain resource allocation A for normal CP), where msgA-timeDomainAllocation may indicate the values used in the list.

TABLE 9

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Contention-Free RACH

Figure 8:
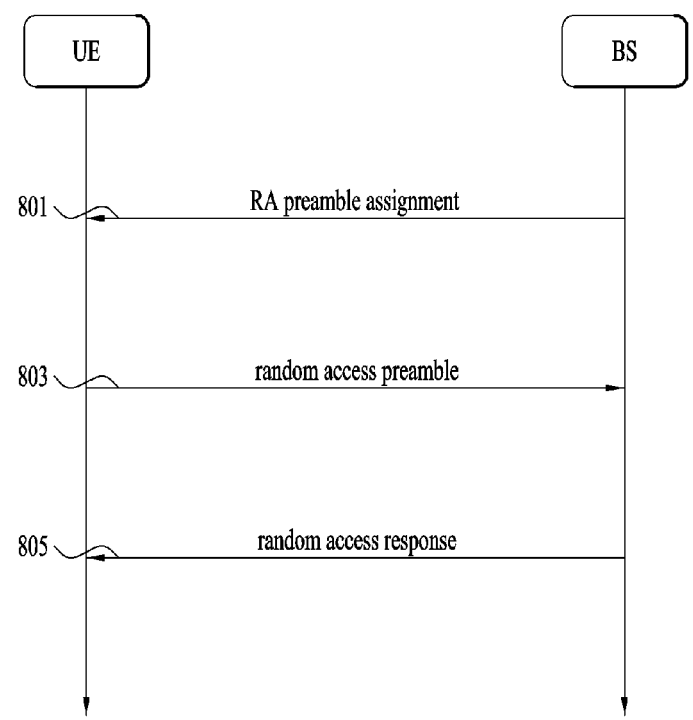
FIG. 8 is a diagram illustrating a contention-free RACH procedure to which various embodiments are applicable.

FIG. 8 is a diagram illustrating an exemplary contention-free RACH procedure to which various embodiments are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (801). Information about the dedicated RACH preamble may be included in an RRC message (e.g., a handover command) or provided to the UE by a PDCCH order. When the RACH procedure starts, the UE transmits the dedicated RACH preamble to the BS (803). When the UE receives an RAR from the BS, the RACH procedure is completed (805).

In the contention-free RACH procedure, a CSI request field in an RAR UL grant indicates whether the UE is to include an aperiodic CSI report in a corresponding PUSCH transmission. An SCS for the Msg3 PUSCH transmission is provided by an RRC parameter. The UE may transmit the PRACH and the Msg3 PUSCH in the same UL carrier of the same serving cell. A UL BWP for the Msg3 PUSCH transmission is indicated by SystemInformationBlock1 (SIB1).

PRACH Preamble Structure

In the NR system, an RACH signal used for initial access to the BS, that is, for initial access to the BS through a cell used by the BS may be configured using the following elements.

Cyclic prefix (CP): The CP blocks interference from the previous (OFDM) symbol and binds PRACH preamble signals arriving at the BS with different time delays in the same time zone. That is, when a CP is configured to match a maximum cell radius, PRACH preambles transmitted in the same resources by UEs in the cell are inside a PRACH reception window corresponding to a PRACH preamble length configured for PRACH reception by the BS. The length of the CP is generally set equal to or greater than a maximum round trip delay (RTT). The CP may have length TCP.

Preamble (sequence): A sequence is defined for the BS to detect a signal transmission, and a preamble conveys this sequence. The preamble sequence may have length TSEG.

Guard time (GT): The GT is a time period defined to prevent a PRACH signal transmitted from a remotest location of PRACH coverage from the BS and arriving at the BS with a delay from interfering a signal arriving after a PRACH symbol duration. Because the UE does not transmit a signal during this time period, the GT may not be defined as a PRACH signal. The GT may have length TGP.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1 Positioning Protocol Configuration

Figure 9:
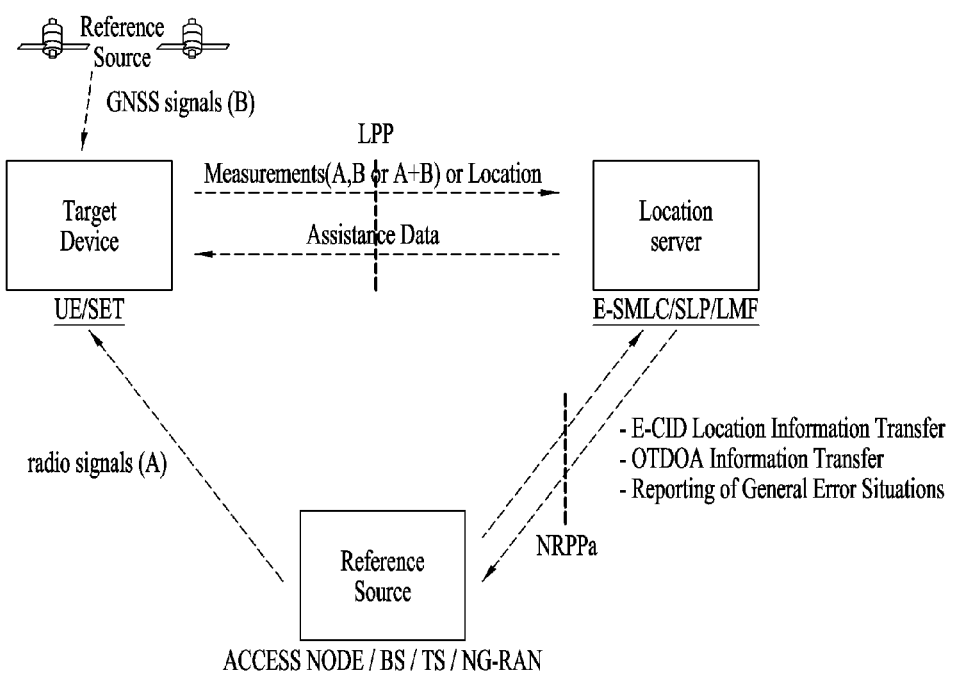
FIG. 9 is a diagram illustrating a positioning protocol configuration for positioning a user equipment (UE), to which various embodiments are applicable.

FIG. 9 is a diagram illustrating an exemplary positioning protocol configuration for positioning a UE, to which various embodiments are applicable.

Referring to FIG. 9, an LTE positioning protocol (LPP) may be used as a point-to-point protocol between a location server (E-SMLC and/or SLP and/or LMF) and a target device (UE and/or SET), for positioning the target device using position-related measurements acquired from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Positioning Reference Signal (PRS)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1))$$ [Equation 1]

In Equation 1, c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}(N_{symb}^{slot}n_{s,f}^{\mu} + l + 1)(2(n_{ID,seq}^{PRS} \bmod 1024) + 1) + (n_{ID,seq}^{PRS} \bmod 1024)\right) \bmod 2^{31}$$ [Equation 2]

In Equation 2, $n_{s,f}^{\mu}$ may be a slot number in a frame in an SCS configuration $\mu$. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in DL a PRS Resource

A PRS sequence r(m) may be scaled by $\beta_{PRS}$ and mapped to REs $(k,l)_{p,\mu}$, specifically by Equation 3. $(k,l)_{p,\mu}$ may represent an RE (k, l) for an antenna port p and the SCS configuration $\mu$.

$$a_{k,l}^{(p,\mu)} = \beta_{PRS}r(m)$$ [Equation 3]

m=0, 1, . . . .
$k = mK_{comb}^{PRS} + ((k_{offset}^{PRS} + k') \bmod K_{comb}^{PRS})$
$l = l_{start}^{PRS}, l_{start}^{PRS}+1, \ldots, l_{start}^{PRS}+L_{PRS}-1$ Herein, the following conditions may have to be satisfied:

The REs (k, l)$_{p, \mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2, 4, 6, 12\}$ may be given by a higher-layer parameter DL-PRS-NumSymbols. A comb size $K_{comb}^{PRS} \in \{2, 4, 6, 12\}$ may be given by a higher-layer parameter transmissionComb. A combination $\{L_{PRS}, K_{comb}^{PRS}\}$ of $L_{PRS}$ and $K_{comb}^{PRS}$ may be one of {2, 2}, {4, 2}, {6, 2}, {12, 2}, {4, 4}, {12, 4}, {6, 6}, {12, 6} and/or {12, 12}. An RE offset $k_{offset}^{PRS} \in \{0, 1, \ldots, K_{comb}^{PRS}-1\}$ may be given by combOffset. A frequency offset k' may be a function of $l-l_{start}^{PRS}$ as shown in Table 10.

TABLE 10

| | Symbol number within the downlink PRS resource $l-l_{start}^{PRS}$ | | | | | | | | | | |
|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu}n_f + n_{s,f}^{\mu} - T_{offset}^{PRS} - T_{offset,res}^{PRS}\right) \bmod 2^{\mu} T_{per}^{PRS} \in \quad \text{[Equation 4]}$$

$$\left\{iT_{gap}^{PRS}\right\}_{i=0}^{T_{rep}^{PRS}-1}$$

$N_{slot}^{frame,\mu}$ may be the number of slots per frame in the SCS configuration μ. $n_f$ may be a system frame number (SFN). $n_{s,f}^{\mu}$ may be a slot number in a frame in the SCS configuration μ. A slot offset $T_{offset}^{PRS} \in \{0, 1, \ldots, T_{per}^{PRS} - 1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4, 5, 8, 10, 16, 20, 32, 40, 64, 80, 160, 320, 640, 1280, 2560, 5120, 10240\}$ may be given by a higher-layer parameter DL-PRS-Periodicity. A repetition factor $T_{rep}^{PRS} \in \{1, 2, 4, 6, 8, 16, 32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1, 2, 4, 8, 16, 32\}$ may be given by a higher-layer parameter DL-PRS-ResourceTimeGap.

2.3. UE Positioning Architecture

Figure 10:
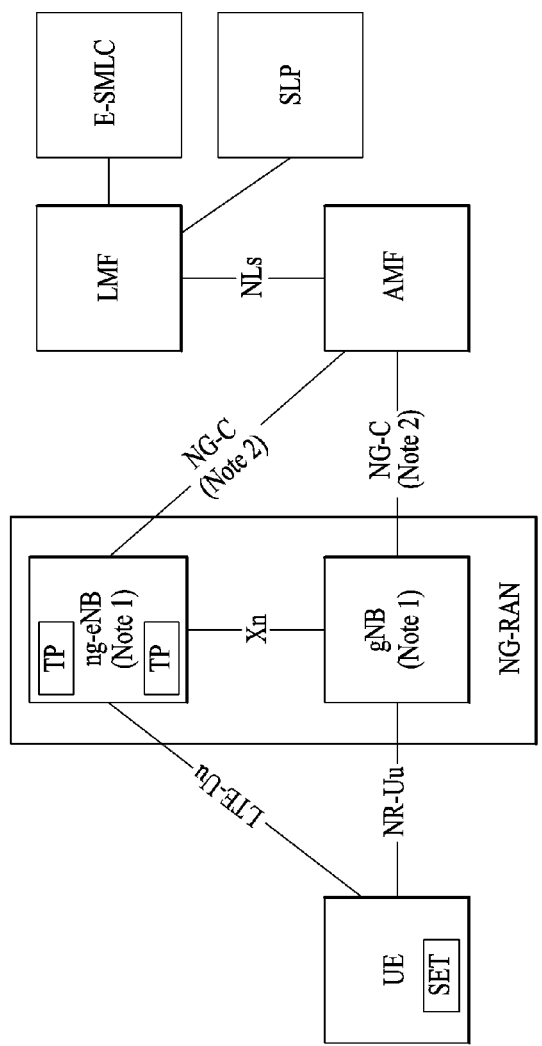
FIG. 10 illustrates architecture of a 5G system applicable to positioning of a UE connected to an NG-RAN or an E-UTRAN.

FIG. 10 illustrates architecture of a 5G system applicable to positioning of a UE connected to an NG-RAN or an E-UTRAN.

Referring to FIG. 10, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 11:
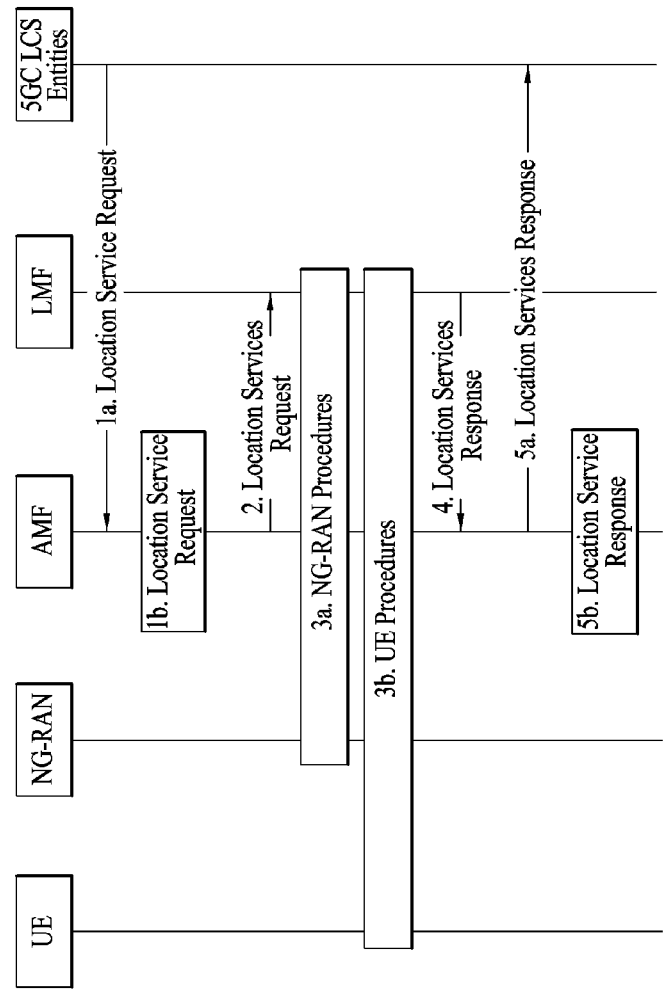
FIG. 11 illustrates an implementation example of a network for UE positioning.

FIG. 11 illustrates an implementation example of a network for UE positioning, which may be used in various embodiments.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 11. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Protocol for Positioning Measurement

LTE Positioning Protocol (LPP)

Figure 12:
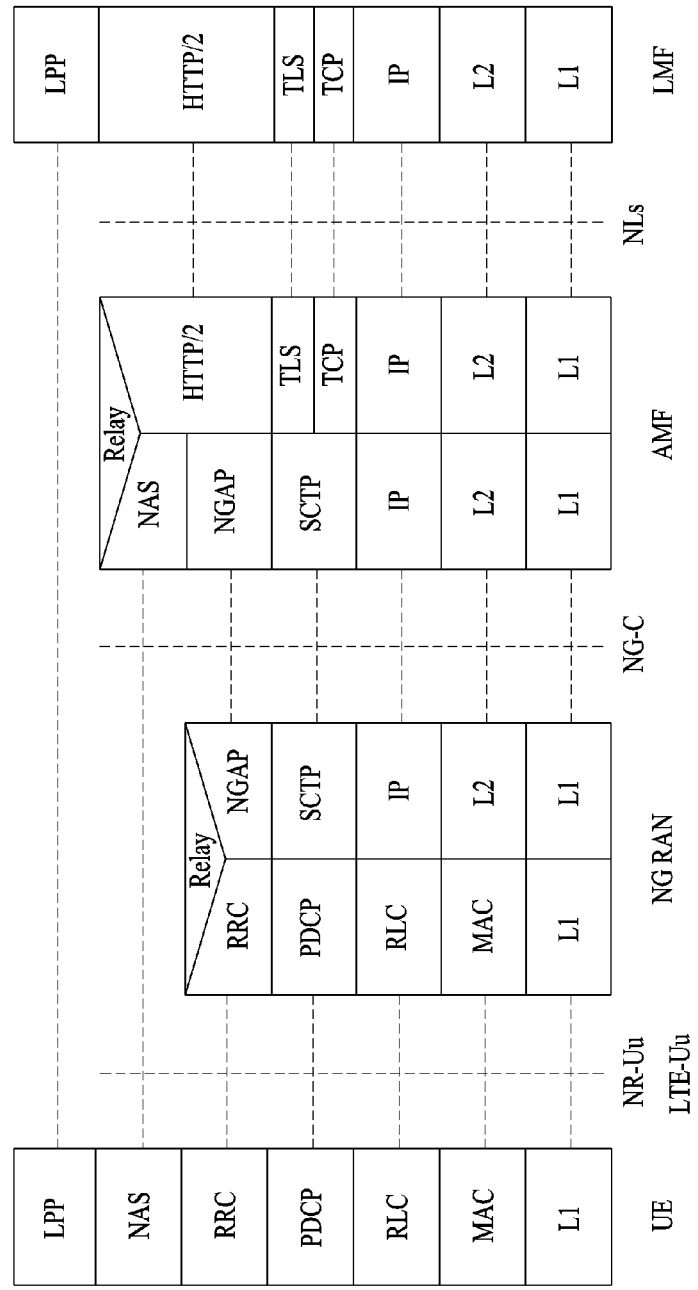
FIG. 12 is a diagram illustrating protocol layers for supporting LTE positioning protocol (LPP) message transmission, to which various embodiments are applicable.

FIG. 12 is a diagram illustrating exemplary protocol layers for supporting LPP message transmission, to which various embodiments are applicable. An LPP PDU may be transmitted in a NAS PDU between an AMF and a UE.

Referring to FIG. 12, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol a (NRPPa)

Figure 13:
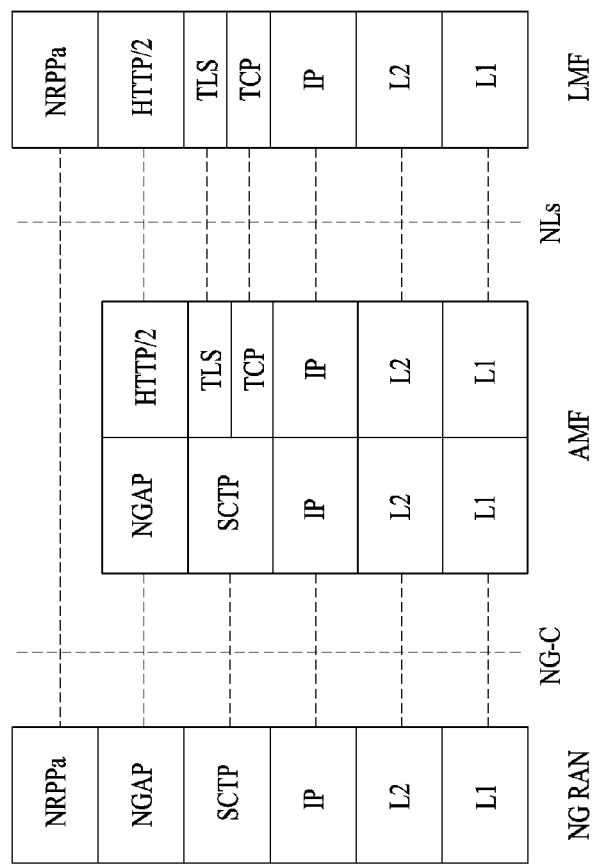
FIG. 13 is a diagram illustrating protocol layers for supporting NR positioning protocol a (NRPPa) protocol data unit (PDU) transmission, to which various embodiments are applicable.

FIG. 13 is a diagram illustrating exemplary protocol layers for supporting NRPPa PDU transmission, to which various embodiments are applicable.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a Global Navigation Satellite System (GNSS), an OTDOA, an enhanced cell ID (E-CID), barometric sensor positioning, WLAN positioning, Bluetooth positioning, a terrestrial beacon system (TBS), uplink time difference of arrival (UTDOA) etc. Although any one of the positioning methods may be used for UE positioning, two or more positioning methods may be used for UE positioning.

OTDOA (Observed Time Difference of Arrival)

Figure 14:
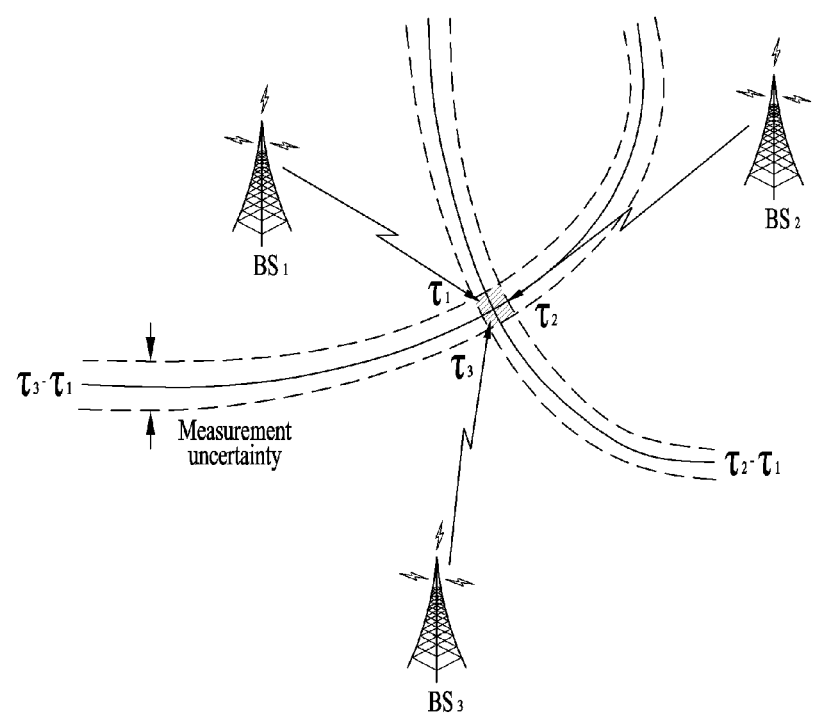
FIG. 14 is a diagram illustrating an observed time difference of arrival (OTDOA) positioning method, to which various embodiments are applicable.

FIG. 14 is a view illustrating an OTDOA positioning method, which may be used in various embodiments.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi,_1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 5]

where c is the speed of light, {xt, yt} are (unknown) coordinates of a target UE, {xi, yi} are (known) coordinates of a TP, and {x1, y1} are coordinates of a reference TP (or another TP). Here, (Ti−T1) is a transmission time offset between two TPs, referred to as "real time differences" (RTDs), and ni and n1 are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or AoA Here, TADV may be divided into Type 1 and Type 2 as follows.

TADV Type 1=(ng-eNB RX-TX time difference)+(UE E-UTRA RX-TX time difference)

TADV Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 15:
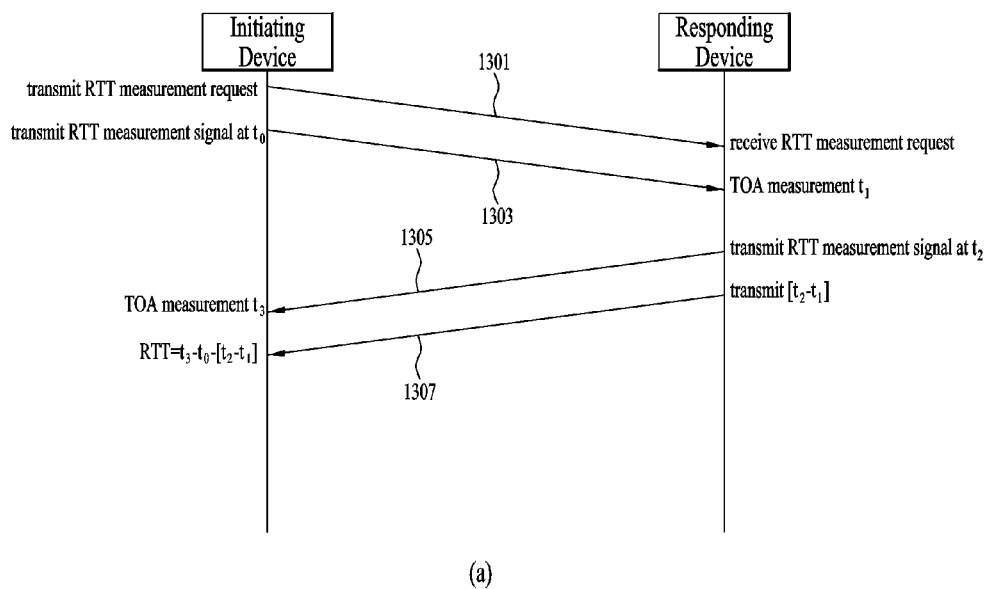
FIG. 15 is a diagram illustrating a multi-round trip time (multi-RTT) positioning method to which various embodiments are applicable.
Figure 15:
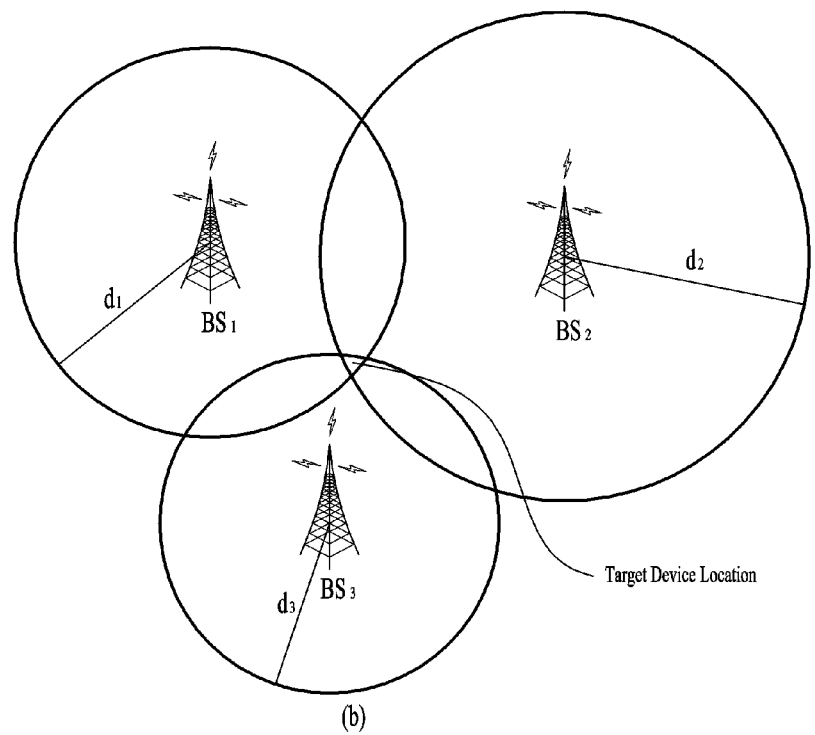

FIG. 15 is a diagram illustrating an exemplary multi-round trip time (multi-RTT) positioning method to which various embodiments are applicable.

Referring to FIG. 15(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1501 according to various embodiments, the initiating device may transmit an RTT measurement request, and the responding device may receive the RTT measurement request.

In operation 1503 according to various embodiments, the initiating device may transmit an RTT measurement signal at t0 and the responding device may acquire a ToA measurement t1.

In operation 1505 according to various embodiments, the responding device may transmit an RTT measurement signal at t2 and the initiating device may acquire a ToA measurement t3.

In operation 1507 according to various embodiments, the responding device may transmit information about [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \qquad \text{[Equation 6]}$$

Referring to FIG. 13(b), the RTT may correspond to a double-range measurement between the two devices. Positioning estimation may be performed from the information. Based on the measured RTT, d1, d2 and d3 may be determined, and a target device location may be determined to be the intersection of circles with BS1, BS2, and BS3 (or TRPs) at the centers and radiuses of d1, d2 and d3.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
ECID: enhanced cell identifier
GNSS: global navigation satellite system
LMF: location management function
MAC: medium access control
MCS: modulation and coding scheme
MO-LR request: mobile originated location request. The UE may transmit an MO-LR request included in a UL NAS Transport message to an access and mobility management function (AMF). The MO-LR request may carry an LPP PDU to initiate an LPP procedure for transferring at least one of capabilities, request assistance data, request location information, and/or transfer location information.
OTDOA (OTDoA): observed time difference of arrival
PRS: positioning reference signal
RB: resource block
RS: reference signal
RTT: round trip time
RSTD: reference signal time difference/relative signal time difference
SC: subcarrier
SRS: sounding reference signal
SS: synchronization signal
SSB: synchronization signal block
SS/PBCH: synchronization signal/physical broadcast channel
TA: timing advance/time advance
TBS: transport block size
TRP: transmission and reception point (TP: transmission point)
posSIB: positioning system information block. The posSIB may refer to an SIB containing positioning information. The posSIB may include assistance data for positioning. The assistance data may be included in a subfield (e.g., SIBpos) of the posSIB. The assistance data may include a PRS identifier (ID) for identifying a DL PRS resource. The assistance data may be configured by the server/LMF and transmitted through the BS to the UE in the posSIB.
SIB: System Information Block In the description of various embodiments, each of N, P, Q, and X, each denoting the number of bits, may be a natural number or an integer (greater than or equal to 0).

In the description of various embodiments, the BS may be understood as a comprehensive term including a remote radio head (RRH), an eNB, a gNodeB, a TP, a reception point (RP), and a relay.

In the description of various embodiments, "exceeding/greater than or equal to A" may be replaced with "greater than or equal to/exceeding A."

In the description of various embodiments, "less than/less than or equal to B" may be replaced with "less than or equal to/less than B."

In description of various embodiments, a UE-based positioning method may be related to a method by which a UE directly calculates/acquires location/position information thereon.

In description of various embodiments, the UE-assisted positioning method may be related to a method by which the UE calculates/acquires and reports measurements related to UE location/positioning (e.g., values used by the BS/server/LMF for UE positioning; e.g., measured values for one or more of RSTD, AoA, AoD, RTT, and ToA), and the network node (e.g., BS/server/LMF, etc.) that receives this report calculates/acquires location/positioning information on the UE.

For example, in the UE-assisted positioning method, the result of measurement by the UE should be transmitted/reported to the BS or the like, and therefore a separate resource for such transmission/reporting may be allocated.

For example, in the UE-based positioning method, the UE directly calculates/acquires the location thereof based on the measurement result from the UE, and accordingly it may not be necessary to allocate a separate resource for transmission/reporting. As another example, in the UE-based positioning method, when the UE needs to transmit/report the location information thereon to the BS/server/LMF (e.g., when the UE is configured to transmit/report the information to the BS/server/LMF), a separate resource for transmission/reporting may be allocated.

For example, one or more of the following details may be considered in order to support DL positioning measurements in the idle/inactive modes:
1) In both UE-assisted and UE-based methods:
   Regardless of the positioning methods (e.g., UE-assisted and UE-based methods), the UE may perform positioning measurement based on information transmitted through RRC information/system information;
   For example, connection may be established only in the minimum SIB, and the minimum SIB may not include the positioning SIB (posSIB);
   For example, when dedicated PRS configuration is allowed, resources may be used more efficiently and/or the location may be more accurately estimated.
2) In the UE-assisted method, the UE may fail to transmit the measurement report when resources for the measurement report are not configured/allocated.

According to various embodiments, in consideration of the above-described matters, dedicated signaling without switching to the RRC connected state may be considered.

According to various embodiments, several procedures (e.g., paging procedure, RACH procedure, etc.) before switching to the RRC connected state may be used. For example, a paging message, Msg2, Msg3, and/or MsgA may be used. For example, a 2-step random access procedure and/or a 4-step random access procedure may be used. If the UE is in the RRC idle/inactive state, the UE may perform PRS or SSB measurement in order to calculate/obtain timing measurements. The timing measurements may be reported over a MsgA PUSCH (i.e., a PUSCH included/transmitted in MsgA) of the 2-step random access procedure. For example, the BS may transmit a gNB Rx-Tx time difference measurement to the UE in MsgB of the 2-step random access procedure, and the UE may use the gNB Rx-Tx time difference measurement to calculate/obtain an RTT. Additionally, it may be considered that the PRS measurement and/or reporting of the UE is triggered by paging.

Various embodiments may be related to triggering conditions for UE positioning measurement. Various embodiments may be applied to both UE-assisted/UE-based positioning methods.

In the description of various embodiments, the embodiments are described based on positioning based on PRS measurements, but the embodiments are not limited thereto. For example, various measurement methods may be applied to triggering for positioning measurement based on a reference signal (e.g., SSB/CSI-RS (channel state information reference signal, etc.) other than the PRS and/or a method (e.g., a positioning method based on GNSS/barometric pressure sensor/WLAN/Bluetooth/TBS/motion sensor, etc.) other than the method using a reference signal.

In a wireless communication system (e.g., a wireless communication system supporting Release 16 and/or earlier standard technology) to which various embodiments are applicable, UE positioning may be supported for an RRC connected UE. However, support for positioning of RRC idle/active UEs is considered due to, for example, the need for more accurate management of the location/positioning information about the RRC idle/active UE by the BS/server (location server)/LMF and/or the need for direct management of the location/positioning information by the RRC idle/active UE. For example, by supporting the positioning of the RRC idle/inactive UE, a gain may be obtained in terms of time and/or power required for state transition of the UE.

In wireless communication systems supporting Release 16 and/or technologies before Release 16, UE positioning may be supported for RRC-connected UEs. However, since the BS/server (location server)/LMF needs to manage location/positioning information on UEs in the RRC idle/inactive state and/or the UEs in the RRC idle/inactive state also need to manage their location/positioning information, support of positioning of the UEs in the RRC idle/inactive state is being considered. For example, if positioning of the UE in the RRC idle/inactive state is supported, there may be a gain in terms of time and/or power required for the state transition of the UE When the UE is in the RRC idle/inactive state, the direct connection between the UE and the BS/server/LMF is limited (e.g., there is no LPP connection), a positioning mechanism based on predetermined/defined/configured rules/mechanisms may be required.

Various embodiments may be related to positioning methods based on the 2-step random access procedure (i.e., Type-2 random access procedure, 2-step RACH procedure, etc.) for RRC idle/inactive UEs. According to various embodiments, the UE and/or BS may exchange information on positioning measurements in signals and/or data transmitted and received in each step of the 2-step random access procedure. Additionally/alternatively, the UE and/or BS may execute/perform procedures mutually agreed/defined therebetween based on the corresponding information.

According to various embodiments, a method of triggering positioning based on the 2-step random access procedure may be provided.

According to various embodiments, each message of the 2-step random access procedure may include information on the random access procedure (and/or information on initial access) (and/or serve as a message for the random access procedure). At the same time, each message may include information on positioning measurement (and/or serve as a message for the positioning measurement). Additionally/alternatively, each message may include information on positioning measurement (and/or serve as a message for the positioning measurement only).

In the description of various embodiments, when it is said that something is for/related to positioning measurement may be interpreted to mean that the thing is the thing is for/related to the random access procedure (and/or initial access procedure) and/or the positioning measurement. For example, a preamble for/related to positioning measurement may be understood as a preamble for/related to the random access procedure (and/or initial access procedure) and/or the positioning measurement. In the description of various embodiments below, when it is said that something is for/related to the random access procedure, it may be interpreted to mean that the thing is not for/related to positioning measurement but is for/related to the random access procedure (and/or initial access procedure). That is, something for/related to the random access procedure may be understood as distinct from that for/related to positioning measurement.

When a positioning procedure based on the 4-step random access procedure is triggered, one or more of the messages of the 4-step random access procedure may include information related to positioning measurement. However, various embodiments are not limited thereto. For example, even if the positioning procedure based on the 4-step random access procedure is not triggered according to specific needs and/or rules, the information related to positioning measurement may be included in one or more of the messages of the 4-step random access procedure.

According to various embodiments, each message of the 4-step random access procedure used for positioning measurement may be defined/named as Msg1 to Msg4. Alternatively, each message may be defined/named different from Msg1 to Msg4. For example, each message may be generalized as first to fourth messages.

For example, a preamble in Msg1 may allow the BS to acquire UL synchronization and at the same time, configure/indicate/request positioning measurement triggering to the UE.

For example, Msg2 may include information related to the random access procedure (e.g., at least one of information on a preamble sequence detected from the network, a timing correction obtained based on a preamble reception timing, scheduling information for Msg3, or a temporary cell radio network temporary identifier (TC-RNTI)) and information related to positioning measurement (e.g., assistance data) and/or include information for positioning measurement (e.g., assistance data).

For example, Msg3 may include information related to the random access procedure (e.g., at least one of an RRC connection request or a UE ID) and information related to positioning measurement (e.g., measurements for positioning). Additionally/alternatively, message3 may include information related to positioning measurement (e.g., measurements for positioning).

For example, Msg4 may include information related to the random access procedure (e.g., information related to contention resolution) and information related to positioning measurement (e.g., assistance data). Additionally/alternatively, Msg4 may include information related to positioning measurement (e.g., assistance data).

When a positioning procedure based on the 2-step random access procedure is triggered, one or more of the messages of the 2-step random access procedure may include information related to positioning measurement. However, various embodiments are not limited thereto. For example, even if the positioning procedure based on the 2-step random access procedure is not triggered according to specific needs and/or rules, the information related to positioning measurement may be included in one or more of the messages of the 2-step random access procedure.

According to various embodiments, each message of the 2-step random access procedure used for positioning measurement may be defined/named as MsgA and MsgB. Alternatively, each message may be defined/named different from MsgA and MsgB. For example, each message may be generalized as first and second messages.

According to various embodiments, MsgA may include information (preamble) included in Msg1 and information included in Msg3 (PUSCH).

According to various embodiments, MsgB may include information included in Msg2 and information included in Msg4 described above.

Figure 16:
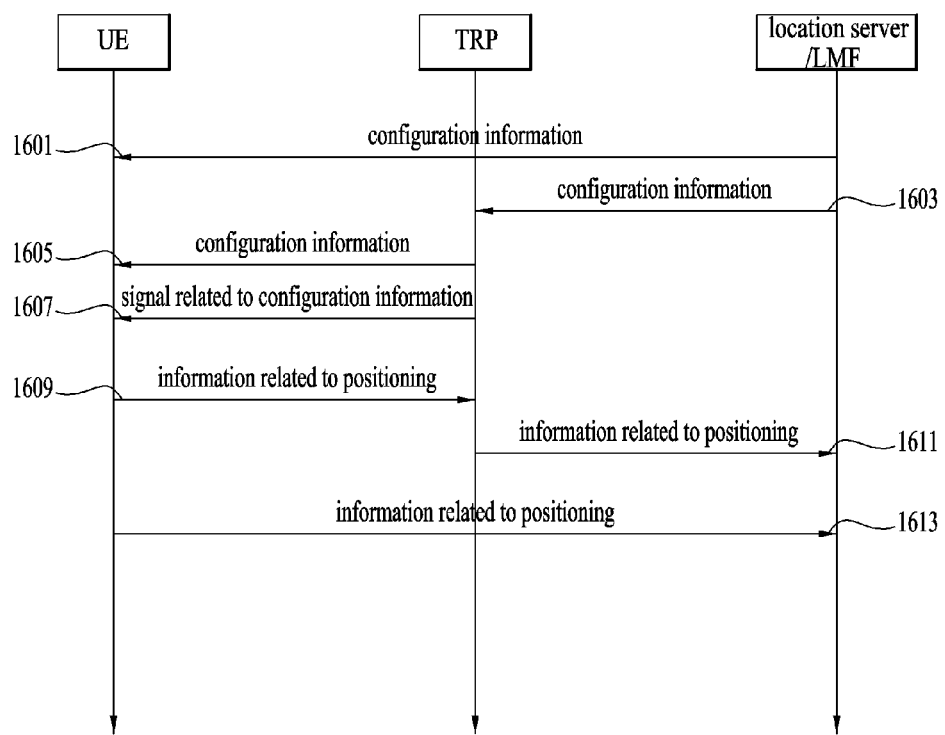
FIG. 16 is a simplified diagram illustrating a method of operating a UE, a transmission and reception point (TRP), a location server, and/or a location management function (LMF) according to various embodiments.

FIG. 16 is a simplified diagram illustrating a method of operating a UE, a TRP, a location server, and/or an LMF according to various embodiments.

Referring to FIG. 16, the location server and/or the LMF may transmit configuration information to the UE, and the UE may receive the configuration information in operation 1601 according to various embodiments.

The location server and/or the LMF may transmit reference configuration information to the TRP, and the TRP may receive the reference configuration information in operation 1603 according to various embodiments. The TRP may transmit the reference configuration information to the UE, and the UE may receive the reference configuration information in operation 1605 according to various embodiments. In this case, operation 1601 according to various embodiments may be skipped.

On the contrary, operations 1603 and 1605 according to various embodiments may be skipped. In this case, operation 1601 according to various embodiments may be performed.

That is, operation 1601 according to various embodiments and operations 1603 and 1605 according to various embodiments may be selectively performed.

In operation 1607 according to various embodiments, the TRP may transmit a signal related to the configuration information to the UE, and the UE may receive the signal related to the configuration information. For example, the signal related to the configuration information may be a signal for positioning the UE.

In operation 1609 according to various embodiments, the UE may transmit a positioning-related signal to the TRP, and the TRP may receive the positioning-related signal. In operation 1611 according to various embodiments, the TRP may transmit the positioning-related signal to the location server and/or the LMF, and the location server and/or the LMF may receive the positioning-related signal.

In operation 1613 according to various embodiments, the UE may transmit the positioning-related signal to the location server and/or the LMF, and the location server and/or the LMF may receive the positioning-related signal. In this case, operations 1609 and 1611 according to various embodiments may be skipped.

On the contrary, operation 1613 may be skipped. In this case, operations 1611 and 1613 according to various embodiments may be performed.

That is, operations 1609 and 1611 according to various embodiments and operation 1613 according to various embodiments may be selectively performed.

According to various embodiments, the positioning-related signal may be acquired based on the configuration information and/or the signal related to the configuration information.

Figure 17:
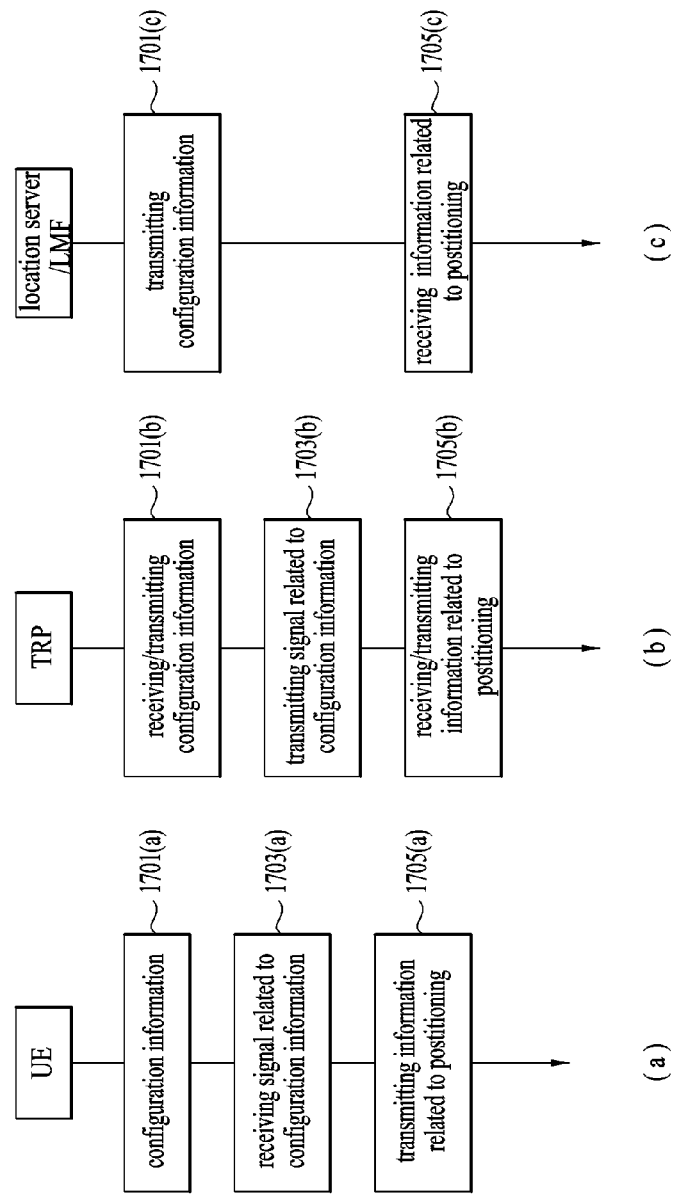
FIG. 17 is a simplified diagram illustrating a method of operating a UE, a TRP, a location server, and/or an LMF according to various embodiments.

FIG. 17 is a simplified diagram illustrating a method of operating a UE, a TRP, a location server, and/or an LMF according to various embodiments.

Referring to FIG. 17(*a*), the UE may receive configuration information in operation 1701(*a*) according to various embodiments.

In operation 1703(*a*) according to various embodiments, the UE may receive a signal related to the configuration information.

In operation 1705(*a*) according to various embodiments, the UE may transmit information related to positioning.

Referring to FIG. 17(*b*), the TRP may receive configuration information from the location server and/or the LMF and transmit the received configuration information to the UE in operation 1701(*b*) according to various embodiments.

In operation 1703(*b*) according to various embodiments, the TRP may transmit a signal related to the configuration information.

In operation 1705(*b*) according to various embodiments, the TRP may receive information related to positioning and transmit the received information related to positioning to the location server and/or the LMF.

Referring to FIG. 17(*c*), the location server and/or the LMF may transmit configuration information in operation 1701(*c*) according to various embodiments.

In operation 1705(*c*) according to various embodiments, the location server and/or the LMF may receive information related to positioning.

For example, the configuration information may be understood as being related to reference configuration (information) and/or one or more pieces of information that the location server and/or the LMF and/or the TRP transmits to/configures for the UE, and/or as being the reference configuration (information) and/or the one or more pieces of information that the location server and/or the LMF and/or the TRP transmits to/configures for the UE, in the following description of various embodiments.

For example, the signal related to positioning may be understood as a signal related to at least one piece of information reported by the UE and/or as a signal including the at least one piece of information reported by the UE, in the following description of various embodiments.

For example, BS, gNB, or cell may be replaced with TRP, TP, or any device playing the same role, in the following description of various embodiments.

For example, location server may be replaced with server, LMF, or any device playing the same role, in the following description of various embodiments.

More specific operations, functions, terms, and so on in operations according to various embodiments may be performed and described based on various embodiments described later. The operations according to various embodiments are exemplary, and one or more of the above-described operations may be omitted according to specific details of each embodiment.

A detailed description will be given below of various embodiments. Unless contradicting each other, the various embodiments described below may be combined fully or partially to form other various embodiments, which may be clearly understood by those skilled in the art.

Various embodiments may be related to methods of using the RACH procedure so that positioning measurement of the UE in the RRC inactive/idle state is capable of being supported.

A positioning measurement procedure may include request and/or transfer of Information about capabilities between the BS/server/LMF and the target (UE) and/or transmission/reception of location information after transmission/reception of assistance data. The location information transmission operation performed by the BS/server/LMF may request the UE to perform PRS measurement and at the same time inform the UE of information that the BS/server/LMF desires to obtain (i.e., request the UE to send information necessary for the BS/server/LMF). The necessary information may mean measurement information to be reported by the UE. For example, the necessary information may include at least one of an RSTD, an RTT, information on a PRS resource ID used to acquire measurements, information on a PRS resource set ID used to acquire measurements, information on a TP used to acquire measurements, information on a time stamp, information about the quality of measurements, but the various embodiments are not limited thereto.

In wireless communication systems supporting Release 16 and/or technologies before Release 16, positioning measurement may be performed when one-to-one and/or multiple-to-one session connection is established between the BS/server/LMF and the target (UE) in serial and/or parallel. Accordingly, both cell-specific information and UE-specific information may be transmitted for measurement only for RRC connected UEs, and a measurement report (MR) may be obtained from a specific UE.

Various embodiments may be related to positioning methods for UEs in the RRC idle/inactive state based on the 2-step random access procedure. According to various embodiments, triggering of the session connection between the BS/server/LMF and the target UE (destination UE) may be performed in the following two ways: triggering by the UE and triggering by the BS/server/LMF.

According to various embodiments, cell-common information related to positioning may be provided in system information.

Information transmitted and received in each process according to various embodiments and/or operations/actions performed in each process may be embodied from the following description.

1. MsgA Preamble for Positioning Measurement

A RACH occasion (RO) may be shared between the 2-step random access procedure and the 4-step random access procedure. For example, a PRACH preamble for the 4-step random access procedure and a PRACH preamble for the 2-step random access procedure may be separately configured/designated. In both cases where RO sharing is allowed or not allowed, the PRACH preamble for the 4-step random access procedure and the PRACH preamble for the 2-step random access procedure may be separately configured/designated.

For example, if 64 PRACH preambles are allocated for the contention-based random access procedure, it may be configured/indicated that the first 32 PRACH preambles are PRACH preambles for the 4-step random access procedure and the last 32 PRACH preambles are PRACH preambles for the 2-step random access procedure. The corresponding configuration/indication may be based on systeminformationblocktype1 (SIB1) and/or a RACH configuration included in UE-specific RRC signaling.

A PRACH preamble may be understood as a code-domain resource, which may be identified by the root index of the preamble. Upon receiving a PRACH preamble, the BS may check whether the corresponding PRACH preamble is the PRACH preamble for the 4-step random access procedure or the PRACH preamble for the 2-step random access procedure so that the BS may recognize whether the UE transmitting the PRACH preamble desires to initiates the 2-step random access procedure or the 4-step random access procedure.

On the other hand, if RO sharing is not allowed (that is, for RO separation), ROs for the 4-step RACH procedure and ROs for the 2-step RACH procedure may be separated. In this case, the BS may recognize based on the corresponding RO whether the UE transmitting a PRACH preamble desires to initiate the 2-step RACH procedure or the 4-step RACH procedure.

For example, if RO sharing is allowed between the 2-step random access procedure and the 4-step random access procedure, PRACH preambles for the (contention-based) 2-step random access procedure may be configured in the remaining PRACH preambles except PRACH preambles for the 4-step random access procedure within an RO for the (contention-based) 4-step random access procedure. The BS may recognize the purpose of the corresponding PRACH preamble transmission (e.g., whether the PRACH preamble is for the 2-step random access procedure or 4-step random access procedure). That is, in the above example, since PRACH preambles for the 2-step random access procedure is configured in the remaining PRACH preambles except PRACH preambles for the 4-step random access procedure among all preambles for contention-based random access, the BS may identify based on the corresponding PRACH preamble whether the PRACH preamble transmitted by the UE is for the 2-step random access procedure or the 4-step random access procedure.

A PUSCH (or PUSCH occasion) of Msg A may be allocated to a PUSCH slot following a RACH slot and/or one or more consecutive slots starting after the corresponding PUSCH slot. That is, in both cases where RO sharing is allowed or not allowed, the PUSCH (or PUSCH occasion) of MsgA may be allocated to a PUSCH slot following a RACH slot and/or one or more consecutive slots starting after the corresponding PUSCH slot.

When ROs are shared between the 2-step random access procedure and the 4-step random access procedure, preambles for the 2-step random access procedure may be the remaining preambles except preambles for other purposes (e.g. SI request), preambles for contention-free random access, and preamble configured for the 4-step random access procedure among all available preambles. Additionally/alternatively, all preambles except the preambles for contention-free random access may be used as the preambles for the 2-step random access procedure, regardless of whether the corresponding random access procedure is the 2-step or 4-step random access procedure.

When separate ROs are configured for the 2-step random access procedure, all preambles except for preambles for contention-free random access may be used. If RO separation is configured, an RO for the 2-step random access procedure and an RO for the 4-step RACH procedure may be separately configured. If RO separation is not configured, all preambles (64 preambles) may be used for the 2-step random access procedure.

As described above, preambles of the 2-step random access procedure transmitted from the UE may be transmitted on the same RO (i.e., same time/frequency resources) as preambles of the 4-step random access procedure. Additionally/alternatively, the preambles of the 2-step random access procedure may be transmitted on separate resources.

According to various embodiments, a preamble used for positioning measurement may be transmitted on the same time/frequency resource as the preamble of the 2-step random access procedure. Additionally/alternatively, the preamble used for positioning measurement may be transmitted on a separate resource. According to various embodiments, the preamble used for positioning measurement may be transmitted based on the 2-step random access procedure. The preamble used for positioning measurement may be transmitted on the same RO as the preamble of the 2-step random access procedure (i.e., a preamble only for the random access procedure) and/or the preamble of the 4-step random access procedure. Additionally/alternatively, the preamble used for positioning measurement may be transmitted on a separate resource. That is, according to various embodiments, RO sharing and/or RO separation may be configured/indicated/defined between an RO for positioning measurement (i.e., positioning RO) and an RO for the random access procedure (i.e., an RO for the 2-step random access procedure and/or an RO for the 4-step random access procedure).

According to various embodiments, in the 2-step random access procedure, since identification information on the UE is transmitted over a MsgA PUSCH, the BS may store information about MsgA preamble detection in a buffer. Then, the BS may perform subsequent UE-specific actions/operations based on information and/or procedures desired by the UE, which are provided over the MsgA PUSCH transmitted after the MsgA preamble.

A. Case 1: Shared RO

In Case 1, a preamble of the 4-step random access procedure, a preamble of the 2-step random access procedure, and a MsgA preamble for positioning measurement may be transmitted on the same time/frequency resource.

According to various embodiments, the BS may configure the MsgA preamble for positioning measurement in different ways. For example, a preamble region for other purposes such as an SI request (preamble region for others) may be used. Thus, the corresponding value (e.g., MsgA preamble for positioning measurement) may be directly transmitted/broadcast through a RACH configuration, and/or a region for contention-based random access and/or contention-free random access may be partially allocated for positioning measurement. For example, at least some preambles among preambles for other purposes and/or at least some preambles among preambles for contention-based random access and/or contention-free random access may be allocated for positioning measurement.

If an RO for the 2-step random access procedure is not shared for the 4-step random access procedure, the total number of preambles indicated by an information element (IE) indicating the total number of preambles used for contention-based random access (CBRA) and contention-free random access (CFRA) may also include preambles for positioning measurement.

For example, an IE indicating the number of SSBs per RO and the number of contention-based (CB) preambles per SSB may be distinguished from an IE indicating the number of SSBs per RO and the number of positioning measurement preambles per SSB.

In the NR system to which various embodiments are applicable, a cell-specific 2-step random access type parameter may be configured based on RACH-ConfigCommonTwoStepRA.

For example, RACH-ConfigCommonTwoStepRA may include msgA-TotalNumberOfRA-Preambles and/or ssb-perRACH-OccasionAndCB-PreamblesPerSSB. Tables 11 and 12 show the configurations and definitions of msgA-TotalNumberOfRA-Preambles and/or ssb-perRACH-OccasionAndCB-PreamblesPerSSB.

TABLE 11

| RACH-ConfigCommonTwoStepRA-r16 ::= | SEQUENCE{ |
|---|---|
| rach-ConfigGenericTwoStepRA-r16 | RACH-ConfigGenericTwoStepRA-r16, |
| msgA-TotalNumberOf RA-Preambles-r16 | INTEGER (1..63) |
| OPTIONAL, -- Need S | |
| msgA-SSB-PerRACH-OccasionAndCB-PreamblesPerSSB-r16 | CHOICE { |
| oneEighth | ENUMERATED |
| {n4, n8, n12, n16, n20, n24, n28, n32, n36, n40, n44, n48, n52, n56, n60, n64}, | |
| oneFourth | ENUMERATED |
| {n4, n8, n12, n16, n20, n24, n28, n32, n36, n40, n44, n48, n52, n56, n60, n64}, | |
| oneHalf | ENUMERATED |
| {n4, n8, n12, n16, n20, n24, n28, n32, n36, n40, n44, n48, n52, n56, n60, n64}, | |
| one | ENUMERATED |
| {n4, n8, n12, n16, n20, n24, n28, n32, n36, n40, n44, n48, n52, n56, n60, n64}, | |
| two | ENUMERATED |
| {n4, n8, n12, n16, n20, n24, n28, n32}, | |
| four | INTEGER (1..16), |
| eight | INTEGER (1..8), |
| sixteen | INTEGER (1..4) |

TABLE 12 msgA-TotalNumberOfRA-Preambles
Indicates the total number of preambles used for contention-based and
contention-free 2-step random access type when ROs for 2-step are
not shared with 4-step. If the field is absent, and 2-step and 4-step does
not have shared ROs, all 64 preambles are available for 2-step
random access type.
msgA-SSB-PerRACH-OccasionAndCB-PreamblesPerSSB
The meaning of this field is twofold: the CHOICE conveys the
information about the number of SSBs per RACH occasion. Value
oneEight corresponds to one SSB associated with 8 RACH occasions,
value oneFourth corresponds to one SSB associated with 4
RACH occasions, and so on. The ENUMERATED part indicates the
number at Contention Based preambles per SSB. Value n4
corresponds to 4 Contention Based preambles per SSB. value n8
corresponds to 8 Contention Based preambles per SSB, and so on.
The total number of CB preambles in a RACH occasion is given by
CB-preamblesper-SSB * max(1, SSB-per-rach-occasion). If the
field is not configured and both 2-step and 4-step are configured for
the BWP the UE applies the value to the field ssb-perRACH-
OccasionAndCB-PreamblesPerSSB in RACH-ConfigCommon.
The field is not present when RACH occasions are
shared between 2-step and 4-step type random access in the BWP.

For example, msgA-TotalNumberOfRA-Preambles designated for CBRA as well as CFRA may also include preambles for positioning measurement. To identify the preambles for positioning measurement, not only ssb-per-RACH-OccasionAndCB-PreamblesPerSSB but also additional values such as ssb-perRACH-OccasionAndPositioning-PreamblesPerSSB may be configured to indicate the number of preambles for positioning measurement.

For example, information including CBRA preambles and CFRA preambles (e.g., information related to the number of preambles including the CBRA preambles and CFRA preambles (except preamble for other purposes), msgA-TotalNumberOfRA-Preambles) may be configured/indicated/transmitted. The number of CFRA preambles may be obtained by subtracting the number of CBRA preambles from the number of preambles including the CBRA preamble and CFRA preamble. According to various embodiments, information for identifying preambles for positioning measurement (positioning preambles) (e.g., information related to the number of preambles for positioning measurement, ssb-perRACH-OccasionAndPositioning-PreamblesPerSSB) may be added. Accordingly, preamble regions may be divided into three regions. For example, the number of CFRA preambles may be obtained by subtracting the number of CBRA preambles and the number of preambles for positioning measurement from the number of preambles including the CBRA preambles and CFRA preambles.

If an RO for the 2-step random access procedure is not shared for the 4-step random access procedure, an IE indicating the number of preambles for positioning measurement may be configured separately from the IE indicating the total number of preambles used for CBRA and CFRA. Additionally/alternatively, the number of SSBs per RO and the number of positioning preambles per SSB may be configured. This may be to use a preamble region for other purposes such as an SI request. For example, the IE separately indicating the number of preambles for positioning measurement may indicate the number of preambles for positioning measurement in the preamble region for other purposes.

For example, in addition to msgA-TotalNumberOfRA-Preambles, msgA-TotalNumberOfPositioningRA-Preambles and/or ssb-perRACH-OccasionAndPositioning-PreamblesPerSSB may be configured/indicated/transmitted to use the preamble region for others (e.g., SI request).

That is, according to various embodiments, preambles for positioning measurement may be separately configured/designated/indicated within a preamble region (e.g., region including preambles for other purposes) except for the preamble region including the CBRA preambles and CFRA preambles. For example, information related to the number of preambles for positioning measurement among preambles for other purposes (i.e., msgA-TotalNumberOfPositioningRA-Preambles) may be transmitted. In this case, the preambles for positioning measurement may correspond to contention-free (CF) preambles. Additionally/alternatively, information related to the number of preambles based on the association between an RO and an SSB (ssb-perRACH-OccasionAndPositioning-PreamblesPerSSB) may be transmitted so that at least some of the preambles for other purposes may be used for positioning measurement. In this case, the preambles for positioning measurement may correspond to contention-based (CB) preambles.

Additionally, according to various embodiments, the total number of preambles for positioning measurement may be grouped according to LPP purposes. For example, the preambles for positioning measurement may be sub-grouped according to one or more of the following LPP purposes:

1) provideCapabilities (transfer capability)
   2) requestAssistanceData (request assistance data)
   3) ProvideLocationinformation (request location information)

According to various embodiments, provideCapabilities (transfer capability) may indicate the LPP capability of a target device (e.g., UE) to the location server. Table 13 shows an exemplary configuration of provideCapabilities.

TABLE 13

```
-- ASN1START
ProvideCapabilities ::= SEQUENCE {
        criticalExtensions          CHOICE {
             c1                              CHOICE {
                     provideCapabilities-r9        ProvideCapabilities-r9-IEs,
                     spare3 NULL, spare2 NULL, spare1 NULL
             },
             criticalExtensionsFuture    SEQUENCE { }
        }
}
ProvideCapabilities-r9-IEs ::= SEQUENCE {
        commonIEsProvideCapabilities       CommonIEsProvideCapabilities       OPTIONAL,
        a-gnss-ProvideCapabilities         A-GNSS-ProvideCapabilities         OPTIONAL,
        otdoa-ProvideCapabilities          OTDOA-ProvideCapabilities          OPTIONAL,
        ecid-ProvideCapabilities           ECID-ProvideCapabilities           OPTIONAL,
        epdu-ProvideCapabilities           EPDU-Sequence                      OPTIONAL,
        ...,
        [[   sensor-ProvideCapabilities-r13    Sensor-ProvideCapabilities-r13      OPTIONAL,
```

TABLE 13-continued

```
            tbs-ProvideCapabilities-r13        TBS-ProvideCapabilities-r13         OPTIONAL,
            wlan-ProvideCapabilities-r13       WLAN-ProvideCapabilities-r13        OPTIONAL,
            bt-ProvideCapabilities-r13         BT-ProvideCapabilities-r13          OPTIONAL
        ]],
        [[  nr-ECID-ProvideCapabilities-r16    NR-ECID-ProvideCapabilities-r16     OPTIONAL,
            nr-Multi-RTT-ProvideCapabilities-r16
                                               NR-Multi-RTT-ProvideCapabilities-r16  OPTIONAL,
            nr-DL-AoD-ProvideCapabilities-r16
                                               NR-DL-AoD-ProvideCapabilities-r16   OPTIONAL,
            nr-DL-TDOA-ProvideCapabilities-r16
                                               NR-DL-TDOA-ProvideCapabilities-r16  OPTIONAL,
            nr-UL-TDOA-ProvideCapabilities-r16 NR-UL-TDOA-ProvideCapabilities-r16  OPTIONAL
        ]]
}
-- ASN1STOP
```

According to various embodiments, requestAssistanceData (request assistance data) may be used by a target device (e.g., UE) to request assistance data to the location server. Table 14 show an exemplary configuration of requestAssistanceData.

TABLE 14

```
-- ASN1START
RequestAssistanceData ::= SEQUENCE {
        criticalExtensions      CHOICE{
            c1                                  CHOICE {
                requestAssistanceData-r9            RequestAssistanceData-r9-IEs,
                spare3 NULL, spare2 NULL, spare1 NULL
            },
            criticalExtensionsFuture    SEQUENCE { }
        }
}
RequestAssistanceData-r9-IEs ::= SEQUENCE {
        commonIEsRequestAssistanceData     CommonIEsRequestAssistanceData      OPTIONAL,
        a-gnss-RequestAssistanceData       A-GNSS-RequestAssistanceData        OPTIONAL,
        otdoa-RequestAssistanceData        OTDOA-RequestAssistanceData         OPTIONAL,
        epdu-RequestAssistanceData         EPDU-Sequence                       OPTIONAL,
        ...,
        [[  sensor-RequestAssistanceData-r14
                                           Sensor-RequestAssistanceData-r14    OPTIONAL,
            tbs-RequestAssistanceData-r14  TBS-RequestAssistanceData-r14       OPTIONAL,
            wlan-RequestAssistanceData-r14 WLAN-RequestAssistanceData-r14      OPTIONAL
        ]],
        [[  nr-Multi-RTT-RequestAssistanceData-r16         NR-Multi-RTT-RequestAssistanceData-r16
        OPTIONAL,
            nr-DL-AoD-RequestAssistanceData-r16            NR-DL-AoD-RequestAssistanceData-r16
        OPTIONAL,
            nr-DL-TDOA-RequestAssistanceData-r16           NR-DL-TDOA-RequestAssistanceData-r16
        OPTIONAL
        ]]
}
-- ASN1STOP
```

According to various embodiments, ProvideLocationinformation (request location information) may be used by a target device (e.g., UE) to provide a positioning measurement and/or a position estimate to the location server. Table 15 shows an exemplary configuration of ProvideLocationinformation.

TABLE 15

```
-- ASN1START
ProvideLocationInformation ::= SEQUENCE {
        criticalExtensions      CHOICE{
            c1                              CHOICE {
                provideLocationInformation-r9    ProvideLocationInformation-r9-IEs
                spare3 NULL, spare2 NULL, spare1 NULL
            },
            criticalExtensionsFuture    SEQUENCE { }
        }
}
```

TABLE 15-continued

```
ProvideLocationInformation-r9-IEs ::= SEQUENCE {
        commonIEsProvideLocationInformation
                                        CommonIEsProvideLocationInformation         OPTIONAL,
        a-gnss-ProvideLocationInformation   A-GNSS-ProvideLocationInformation       OPTIONAL,
        otdoa-ProvideLocationInformation    OTDOA-ProvideLocationInformation        OPTIONAL,
        ecid-ProvideLocationInformation     ECID-ProvideLocationInformation         OPTIONAL,
        epdu-ProvideLocationInformation     EPDU-Sequence                           OPTIONAL,
        ...,
        [[
        sensor-ProvideLocationInformation-r13
                                        Sensor-ProvideLocationInformation-r13
                                                                                    OPTIONAL,
        tbs-ProvideLocationInformation-r13   TBS-ProvideLocationInformation-r13     OPTIONAL,
        wlan-ProvideLocationInformation-r13  WLAN-ProvideLocationInformation-r13    OPTIONAL,
        bt-ProvideLocationInformation-r13    BT-ProvideLocationInformation-r13      OPTIONAL
        ]],
        [[    nr-ECID-ProvideLocationInformation-r16     NR-ECID-ProvideLocationInformation-r16      OPTIONAL,
              nr-Multi-RTT-ProvideLocationInformation-r16
                                                         NR-Multi-RTT-ProvideLocationInformation-r16 OPTIONAL,
              nr-DL-AoD-ProvideLocationInformation-r16
                                                         NR-DL-AoD-ProvideLocationInformation-r16    OPTIONAL,
              nr-DL-TDOA-ProvideLocationInformation-r16
                                                         NR-DL-TDOA-ProvideLocationInformation-r16   OPTIONAL
        ]]
}
-- ASN1STOP
```

According to various embodiments, when the total number of preambles for positioning is N, A preambles may be configured/designated/indicated for the purpose of provideCapabilities, B preambles may be configured/designated/indicated for the purpose of requestAssistanceData, and C preambles may be configured/designated/indicated for the purpose of ProvideLocationinformation.

This may be because the amount of content to be transmitted (e.g., the content of a MsgA PUSCH corresponding to a preamble) may vary depending on the purpose. For example, if 15 preambles are all allocated for positioning measurement, the 15 preambles may be divided into 5 preambles, 5 preambles, and 5 preambles according to purposes 1), 2), and 3). Information about a corresponding value (e.g., information related to the number of preambles for each LPP purpose) may be explicitly configured/indicated by system information (transmitted/broadcast information) (for example, the number of preambles may be explicitly configured/indicated for each LPP purpose). Additionally/alternatively, ratio information (e.g., the ratio of preambles according to each LPP purpose) may be implicitly transmitted. For example, a ratio of 1:1:3 may be configured/indicated, and preambles may be allocated in the order of preamble indices of each subgroup. The 15 preambles may be sequentially indexed. When a ratio of 1:1:3 is configured/indicated, the first three preambles may be allocated to 1), the next three preambles may be allocated to 2), and the remaining 9 preambles may be allocated to 3) in the ascending and/or descending order of indices.

According to various embodiments, the content included in a MsgA PUSCH corresponding to/related to each preamble may vary depending on the subgroup of the preamble.

For example, a MsgA PUSCH corresponding to/related to a preamble belonging to subgroup 1) may include information related to the LPP capability of the UE (and/or the target device). A MsgA PUSCH corresponding to/related to a preamble belonging to subgroup 2) may include information related to requesting assistance data. A MsgA PUSCH corresponding to/related to a preamble belonging to subgroup 3) may include information related to the positioning measurement and/or positioning estimate of the UE (and/or target device).

According to various embodiments, a MsgA PUSCH may include information on positioning measurement (e.g., information related to the above-described LPP purposes) and/or information on an MO-LR request (and/or data/information for other purposes). For example, the size (and/or bits) of a reported payload may vary depending on each purpose, related data may be defined/configured depending on each purpose, and/or a preamble group corresponding/mapped to each purpose may be predefined/preconfigured. Each purpose may correspond to MO-LR request information, transfer capability, request assistance data, request location information, transfer location information, etc., but the various embodiments are not limited thereto.

Additionally/alternatively, among preambles for contention-based random access procedure and/or preambles for contention-free random access procedure, at least some preamble may be configured/defined as preambles for positioning measurement (and/or preambles for triggering positioning measurement). In this case, it may be understood that the preambles configured/defined for positioning measurement are used for the contention-based and/or contention-free random access procedure and are used for positioning measurement at the same time.

B. Case 2: Separated RO

In Case 2, time/frequency resources different from those of an RO for the 2-step/4-step random access procedure may be used as an RO for positioning measurement. According to various embodiments, the RO for the random access procedure and the RO for the positioning measurement may be separately configured/indicated. The use of preambles may vary depending on ROs.

According to various embodiments, all preambles (e.g., 64 preambles) may be used (for positioning measurement). According to various embodiments, all preambles may be sub-grouped according to the purpose for which the positioning preambles are transmitted as in Case 1 described above. Details thereof may be found in the embodiments described in Case 1.

According to various embodiments, UE-identity information may be transmitted over a MsgA PUSCH after preamble transmission as described above in the 2-step random access procedure. Thus, if the preamble is used to measure a UL channel similarly to the SRS, there may be an advantage. Additionally, according to various embodiments, the sequence generation and resource mapping for the preamble may be configured/indicated/designated by system information as in the SRS. For example, a preamble for positioning measurement may be generated/acquired based on a sequence generation rule different from the sequence generation rule of a preamble for the random access procedure. For example, information on the preamble generation based on the different sequence generation rule may be transmitted in system information.

In Case 2, if the BS/server/LMF does not (always) transmits a PRS, a preamble may be used to request the BS/server/LMF to transmit the PRS unlike Case 1. For example, in Case 1, if a preamble is used to request PRS transmission from the BS/server/LMF, transmission of a response (e.g., MsgB and/or Msg4) to the UE may be delayed due to the PRS transmission in the 2-step random access procedure and/or 4-step random access procedure.

Specifically, the priority between a random access response (e.g., Msg2, MsgB, etc.) and PRS transmission (or PRS configuration) may be different between Case 1 and Case 2.

In Case 1, ROs are shared. Thus, when the BS attempts to transmit a message to a specific UE, if another UE requesting the PRS transmits a preamble on an adjacent RO (which is adjacent to an RO on which the specific UE transmits a preamble), the BS may transmit the PRS to the other UE first and then transmit the message (e.g., Msg2, MsgB, etc.) to the specific UE. As a result, the two responses may overlap with each other, resulting in a delay. According to various embodiments, the priority between the two responses may be defined to avoid this issue. For example, the response to the UE performing the random access procedure (e.g., Msg2, MsgB, etc.) may be prioritized over the response to the PRS request (PRS transmission).

On the contrary, in Case 2, ROs are separated. Thus, a UE that requests the PRS and/or triggers the positioning procedure may transmit a preamble for positioning measurement in an RO separated for positioning. In this case, PRS transmission (and/or PRS configuration) may be prioritized.

According to various embodiments, when PRS transmission from the BS/server/LMF is triggered by a preamble, the BS may lower the priority of the PRS transmission. For example, the BS may transmit a response (e.g., Msg2, MsgB, etc.) to the UE performing the random access procedure and then transmit a response (e.g., PRS) to the UE performing positioning measurement. However, PRS transmission may have a high priority.

For example, when PRS transmission from BS/server/LMF is triggered by a MsgA preamble, the PRS may be transmitted/received between the transmission/reception time of the MsgA preamble and the transmission/reception time of a MsgA PUSCH. For example, the PRS may be transmitted/received between an RO to which the MsgA preamble is mapped and a PUSCH occasion (PO) to which the MsgA PUSCH is mapped. However, various embodiments are not limited thereto, and the PRS may be transmitted/received after transmission/reception of the MsgA PUSCH. For example, the PRS may be transmitted/received between transmission/reception of MsgA and transmission/reception of MsgB (and/or Msg2/4). Alternatively, the PRS may be transmitted/received after transmission/reception of MsgB (and/or Msg2/4).

2. MsgA PUSCH for Positioning Measurement

According to various embodiments, the time/frequency resource and/or content for transmission of a MsgA PUSCH for positioning measurement may be provided.

According to various embodiments, if a time/frequency resource (set) on which the MsgA PUSCH for positioning measurement is transmitted is referred to as a MsgA PUSCH occasion (PO), the PO may have a plurality of (multiple) resource units (resource units (RUs) or PUSCH resource units (PRUs)), one RU may be associated/connected with one demodulation reference signal (DMRS) resource (DMRS port or DMRS sequence).

According to various embodiments, the indices of preambles basically increase within one RO. Then, indexing may be performed in the following order: from ROs where frequency division multiplexing (FDM) (frequency domain sharing or frequency multiplexing) is performed to ROs where time division multiplexing (TDM) (time domain sharing or time multiplexing) is performed. For the MsgA PUSCH for positioning measurement, indexing may be first performed from FDMed POs and then performed on DMRS resources within the corresponding POs. Thereafter, indexing may be performed on TDMed POs. According to various embodiments, indexed preambles may be sequentially mapped to PRUs in multiple indexed POs.

According to various embodiments, PRACH preambles may be mapped to valid PRUs within a MsgA association period in the following order:
First, in ascending order of frequency resource indices for frequency-multiplexed POs
Second, in ascending order of DMRS indices within a single PO
The DMRS indices may be determined in ascending order of DMRS port indices first and in ascending order of DMRS sequence indices second.
Third, in ascending order of time resource indices for time-multiplexed POs within one PUSCH slot
Fourth, in ascending order of PUSCH slot indices
For multiple configurations, mapping may be performed between PRUs of each MsgA PUSCH configuration and preambles in a related preamble group.
Each MsgA PUSCH configuration may identify a subset of DMRS port/sequence combinations.
For example, one or more consecutive preamble indices of (valid) PRACH occasions in a slot:
First, in ascending order of preamble indices within one PRACH occasion
Second, in ascending order of frequency resource indices for frequency-multiplexed PRACH occasions
Third, in ascending order of time resource indices for time-multiplexed PRACH occasions within a PRACH slot
May be mapped to a (valid) PO:
First, in ascending order of frequency resource indices for frequency-multiplexed POs
Second, in ascending order of DMRS indices within a PO, where the DMRS indices may be determined in ascending order of DMRS port indices first and in ascending order of DMRS sequence indices second.
Third, in ascending order of time resource indices for time-multiplexed POs within a PUSCH slot
Fourth, in ascending order of PUSCH slot indices.

A. Frequency Resource Allocation

According to various embodiments, the BS may configure/indicate/designate a start resource block/subcarrier (RB/SC) capable of transmitting the MsgA PUSCH for positioning measurement. For example, the corresponding value may be determined based on the lowest RB and/or SC of an initial active BW (and/or initial active BWP). Additionally/alternatively, the corresponding value may be configured/indicated/designated in the form of an offset with respect to the lowest RB and/or SC of an associated RO. For example, the offset may be configured in units of RBs and/or SCs. According to various embodiments, the corresponding value may be transmitted in system information.

According to various embodiments, the numerology may be configured based on a normal/legacy PUSCH different from the MsgA PUSCH and/or configured based on the numerology of a preamble. That is, according to various embodiments, the start RB/SC capable of transmitting the MsgA PUSCH may be provided based on the offset with respect to the lowest RB and/or SC of the initial active BW (and/or initial active BWP). The numerology of the normal PUSCH and/or preamble may be used as the numerology for the offset. According to various embodiments, the number of FDMed POs in the frequency domain may also be transmitted in system information.

B. Time Resource Allocation

According to various embodiments, a slot in which the MsgA PUSCH for positioning measurement is transmitted is given by an offset with respect to a RACH slot in which each MsgA preamble is transmitted. The slot in which the MsgA PUSCH for positioning measurement is transmitted may be identified based on the offset. If the offset is not given, the slot offset of a MsgA PUSCH of the 2-step random access procedure may be used. According to various embodiments, the slot offset of the MsgA PUSCH for the 2-step random access procedure and the slot offset of the MsgA PUSCH for the positioning measurement may be configured separately. If the slot offset of the MsgA PUSCH for positioning measurement is not separately configured, the slot offset of the MsgA PUSCH for the 2-step random access procedure may be applied as the slot offset of the MsgA PUSCH for positioning measurement. According to various embodiments, the same slot offset may be basically applied to MsgA PUSCHs.

According to various embodiments, the symbol offset in the corresponding slot may be determined by the time domain resource allocation (TDRA) table of a normal PUSCH different from the MsgA PUSCH. Additionally/alternatively, the symbol offset in the corresponding slot may be determined by a default table.

C. Different MCS/TBS Size

For example, a message related to positioning measurement may have a large amount of content to be transmitted, differently from (or compared to) a MsgA PUSCH of the 2-step random access procedure and/or Msg3. For example, transmission of capability information on common, GNSS, OTDOA, ECID, external protocol data unit (EPDU), sensor, terrestrial beacon system (TBS), WLAN, and/or Bluetooth, assistance data information, and/or location information may have a larger overhead than the MsgA PUSCH of the 2-step random access procedure and/or Msg3.

Therefore, according to various embodiments, a group of preambles for positioning measurement may have multiple MCS/TBS configurations, independently of the MsgA PUSCH of the 2-step random access procedure. According to various embodiments, different MCSs/TBSs may be configured between the MsgA PUSCH of the 2-step random access procedure and the MsgA PUSCH for the positioning measurement. The content of the MsgA PUSCH for positioning measurement may vary according to the preamble (sub) group related thereto (details thereof may be found in Section 1. MsgA Preamble for Positioning Measurement).

Additionally, according to various embodiments, since the content/message to be transmitted may vary depending on the (LPP) purpose, a separate configuration may be (additionally) defined according to the preamble corresponding to each (LPP) purpose. For example, a separate configuration may be defined according to the preambles corresponding to 1) provideCapabilities, 2) requestAssistanceData, and/or 3) ProvideLocationinformation. According to various embodiments, an MCS/TBS configuration separately defined/configured according to the preamble corresponding to each (LPP) purpose may be applied to the MsgA PUSCH corresponding to each preamble.

Assistance data may be divided into periodic information and aperiodic information. For example, the UE may request only control information (e.g., period and/or pattern) for periodic information, in consideration of data in MsgB. Additionally/alternatively, the UE may request only aperiodic information other than the control information for the corresponding periodic information.

3. Minimum Gap Between MsgA Preamble and PUSCH or MsgB

Continuous PRS transmission of the BS may be a burden in terms of power and resource efficiency.

According to various embodiments, the preamble may perform the aforementioned role and/or serve as an indicator for PRS transmission. That is, according to various embodiments, PRS transmission may be triggered by the preamble. For example, if a persistent PRS is not used, the preamble may be transmitted for the above-described purposes. Additionally/alternatively, the preamble may serve as the indicator for PRS transmission from the BS/server/LMF.

If the preamble is used to trigger PRS transmission from the BS/server/LMF, there may be a need to define/configure a minimum time gap in which the UE is expected to receive MsgB and/or a minimum time gap for the MsgA PUSCH. According to various embodiments, the minimum time gap in which in which the UE is expected to receive MsgB and/or the minimum time gap for the MsgA PUSCH may be defined/configured. According to various embodiments, the minimum gap for transmission of the MsgA PUSCH may be applied when a measurement report is transmitted/received on the MsgA PUSCH.

For example, the minimum gap for transmission of the MsgA PUSCH may be determined by N_gap (for measurement)+N_t1 (processing time for msgA PUSCH) with respect to the last symbol of the preamble (e.g., the last symbol of the last RO among ROs configured in a PRACH slot).

For example, N_gap may correspond to the length of the measurement gap. The measurement gap may be configured in system information and/or have a preconfigured/predefined minimum gap length. The measurement gap configured by the system information may vary depending on whether the frequency range is FR1 and FR2. Information indicating the configuration of a measurement gap applied to FR1 and/or information indicating the configuration of a measurement gap applied to FR2 may be transmitted separately.

N_t1 may denote the preparation time for the MsgA PUSCH ($N_{T,2}$), where $N_{T,2}$ may denote a time duration of N2 symbols corresponding to the PUSCH preparation time for a UE processing capability (e.g., UE processing capability 1).

According to various embodiments, a maximum duration for correctly receiving the PRS from the BS may be configured in order to prevent unnecessary waste of resource, which may occur when the UE performs measurement while expecting continuous PRS reception. The maximum duration may correspond to the maximum length of time that the UE expects to receive the PRS, which may be to prevent the UE from waiting for the PRS reception indefinitely. For example, the maximum duration may be configured in system information.

According to various embodiments, when the UE fails to receive the PRS within the configured (maximum) duration, the UE may transmit the preamble again.

According to various embodiments, since the UE needs to perform PRS measurement if the UE transmits the preamble to request PRS transmission, a separate response window may be configured independently of a response to preamble transmission according to the above-described LPP purpose (e.g., 1) provideCapabilities, 2) requestAssistanceData and/or 3) ProvideLocationinformation). Details may be found in the description of various embodiments below. According to various embodiments, a window for monitoring a response to transmission of the preamble for LPP purpose and a window for monitoring a response to transmission of the preamble for triggering PRS transmission (e.g., PRS) may be separately configured.

4. MsgB for Positioning Measurement

In the 2-step random access procedure, if the BS detects the MsgA preamble but fails to decode the MsgA PUSCH, the BS may transmit a fallback message (fallback RAR) in MsgB to fall back to the 4-step random access procedure. If the BS successfully decode the MsgA PUSCH, the BS may transmit a success message (success RAR) in MsgB.

Considering that latency is important due to the characteristics of positioning measurement, a fallback to the 4-step random access procedure may be considered.

For example, when the UE transmits the preamble for two LPP purposes (e.g., 1) provideCapabilities and/or 3) ProvideLocationinformation) for which a message related to positioning is to be transmitted, if the UE falls back to the 4-step random access procedure, transmits the preamble, receives Msg2, and transmits the corresponding information in Msg3, this may cause ambiguity/uncertainty in positioning accuracy.

In addition, when the UE transmits the corresponding preamble after fallback for another LPP purpose (e.g., 2) requestAssistanceData), if the BS/server/LMF transmits a response to the request without securing the identification of the UE, this may cause resource waste.

Therefore, in this case, the fallback to the 4-step random access procedure may be meaningless. According to various embodiments, the response to MsgA for positioning measurement and/or content thereof transmitted by the BS/server/LMF may be defined in consideration of the above-mentioned problem.

Due to the above-mentioned problem, the fallback to the 4-step random access procedure (for positioning measurement) may not be allowed.

According to various embodiments, the operations of the UE and BS/server/LMF and the content of MsgB may vary depending on the success or failure of MsgA detection and/or the purpose thereof.

A. Case 1: MsgA Preamble Detection Success/MsgA PUSCH Decoding Success

According to various embodiments, for 1) provideCapabilities and 3) ProvideLocationinformation among the following LPP purposes: 1) provideCapabilities, 2) requestAssistanceData, and 3) ProvideLocationinformation, since the preamble is selected/transmitted for the purpose that the UE transmits information to the BS/server/LMF without requesting information, only UE identification information (e.g., TC-RNTI) may need to be transmitted.

Additionally, for example, a TA command and/or a TPC value may not be transmitted when the preamble for positioning measurement is transmitted.

According to various embodiments, for the following LPP purpose: 2) requestAssistanceData, since it is necessary to transmit related information in response to information requested by the BS/server/LMF, the corresponding information (requestAssistancedata) may be directly transmitted in a MAC payload, and/or information on a PDSCH carrying the corresponding information may be additionally configured/indicated. According to various embodiments, UE identification information may be included, and/or information related to hybrid automatic repeat request acknowledgment (HARQ-ACK) for checking whether the UE receives or not may be included. However, no TA command and/or no TPC value may be transmitted in response to positioning measurement. In this case, when the power and/or TA of the UE is required after transmission/transfer (of the preamble) according to the LPP purposes such as purposes 1), 2), and 3), the corresponding value may also be transmitted.

B. Case 2: MsgA Preamble Detection Failure

In Case 2, the BS may not be allowed to transmit/transfer a response to the UE because the BS fails to detect the preamble. Thus, according to various embodiments, the UE may basically expect to receive MsgB within a time window given/configured/defined for MsgB. According to various embodiments, after expiration of the MsgB time window, the UE may reselect and/or transmit the MsgA preamble after backoff based on the command/instruction in a designated/configured/defined backoff indicator (BI). According to various embodiments, the UE may wait until the expiration of the MsgB time window. If the UE fails to receive/decode MsgB during the corresponding window, the UE may reselect and/or transmit the MsgA preamble.

C. Case 3: MsgA Preamble Detection Success and MsgA PUSCH Decoding Failure

Positioning measurement of the UE may be very sensitive to latency.

For example, when the BS receives the MsgA preamble but fails to decode the MsgA PUSCH including the UE identification information, the BS may not perform transmission because the target is unclear even if the BS desires to transfer/transmit information on the reception failure. Therefore, a (additional) mechanism for latency reduction may be desired.

The BS may transfer/transmit the maximum number of times that reception is allowed for a MsgB-RNTI (in system information), and the UE may receive MsgB based on the MsgB-RNTI as many times as the maximum number of receptions and then transmit the preamble again. From the perspective of the BS, the maximum number of receptions may be the maximum number of times that transmission is allowed for the MsgB-RNTI. From the perspective of the UE, the maximum number of receptions may be the maximum number of times that reception is allowed for the MsgB-RNTI.

The sequence generation and/or transmission time/frequency of the preamble may be associated with the IDs of a plurality of UEs. Thus, if the UE fails to detect its own C-RNTI from MsgB when decoding MsgB the first time, the UE may immediately reselect and/or transmit the MsgA preamble according to the value of the BI. According to various embodiments, when the UE fails to detect its own C-RNTI from MsgB, the UE may reselect/transmit the MsgA preamble after backoff based on the command/instruction in the designated/configured/defined BI.

According to various embodiments, when the UE is capable of performing positioning measurement and obtaining a result thereof before transmitting the MsgA PUSCH, the UE may transmit the measurement result over the MsgA PUSCH.

The result may be Providelocationinformation that is an LPP message. For example, the result may include at least one of cell/BS/TRP information, time stamp information, PRS resource information, PRS resource set information, signal strength, an RSTD, a UE Rx-Tx time difference, a gNB Rx-Tx time difference, and/or a BS/TRP Rx-Tx time difference. For example, Providelocationinformation reported by the UE may be an RSTD and/or UE Rx-Tx time difference. According to various embodiments, the BS/Location Server/LMF may configure the UE to transmit only specific information among the corresponding information in system information (e.g., PosSIB) and/or LPP messages (e.g., request location information).

For example, for the MsgA PUSCH, since the number of bits capable of being transmitted is limited, a method for solving this issue may be required. According to various embodiments, the UE may report measurement results to the BS/location server/LMF according to at least one of the following methods.

A. Scenario #1: Transmission of Positioning Measurement Result without Allocation of Additional Bits for MsgA PUSCH In the description of Scenario #1 according to various embodiments, if there is no additional bit allocation for the MsgA PUSCH, it may mean that no additional bits are allocated except for the bits allocated for the MsgA PUSCH (and/or Msg3) in the wireless communication system supporting Release 16 and/or lower. That is, the number of bits allocated for the MsgA PUSCH in Scenario #1 according to various embodiments may be the same as the number of bits allocated for the MsgA PUSCH in the wireless communication system supporting Release 16 and/or lower. At least some bits among the bits allocated for the MsgA PUSCH may be used to transmit positioning measurement results.

Scenario #1 according to various embodiments may be a scenario in which a measurement result for positioning is transmitted with some of the bits allocated for the MsgA PUSCH. That is, Scenario #1 according to various embodiments may be a scenario in which there are extra bits among the bits allocated for the MsgA PUSCH.

Method 1: Transmission of Positioning Measurement Result with Reserved Bits

According to various embodiments, measurement results may be transmitted with unused reserved bits among bits used for transmission of the MsgA PUSCH. For example, 56 and/or 72 bits may be used for transmission of the MsgA PUSCH. If there are reserved bits among the 56 and/or 72 bits, at least parts of the reserved bits may be used to transmit positioning measurement results.

Considering that except for information to be basically transmitted over the MsgA PUSCH (e.g., some of the information included in MsgA), the remaining information needs to be used. (for example, considering that among the bits used for transmission of the MsgA PUSCH, bits remaining after mapping the information to be basically transmitted over the MsgA PUSCH need to be used), the number of remaining bits may be relatively small.

According to various embodiments, considering that the number of remaining bits may be relatively small, the UE may transmit only essential information. In this case, the essential information may be configured/defined as a quantized value.

For example, the essential information may be information about an RSTD.

For example, when the UE in the RRC connected state uses P bits to report the corresponding value (e.g., RSTD) through a measurement report and/or when the UE uses the P bits to report the result (e.g., RSTD), if the available bits of the MsgA PUSCH (for positioning measurement) are N bits and if N<P, relatively low resolution may be applied when the UE performs the measurement report. In this case, resolution lower than the resolution applied when the UE in the RRC connected state performs the measurement report may be applied. Alternatively, resolution greater than the resolution applied when the UE in the RRC connected state performs the measurement report may be applied. Assuming that the resolution applied when the UE in the RRC connected state performs the measurement report is A Tc (and/or A Ts) and the resolution applied when the UE in the RRC idle/inactive state performs the measurement report is B Tc (and/or B Ts), the following relationship A<B may be satisfied. Details thereof will be described later.

According to various embodiments, the essential information and/or corresponding information to be transmitted by the UE may be configured/defined as a quantized value, and the quantized value may be transmitted on the MsgA PUSCH. The quantized value may be predefined and/or configured/indicated by the BS/location server/LMF in system information and/or LPP messages.

The essential information to be transmitted by the UE may be predefined and/or configured/indicated.

The quantized value used when transmitting and receiving the essential information may be predefined and/or configured/indicated.

B. Scenario #2: Transmission of Positioning Measurement Result Based on Additional Bit Allocation for MsgA PUSCH In the description of Scenario #2 according to various embodiments, if additional bits are allocated for the MsgA PUSCH, it may mean that additional bits are allocated in addition to the bits allocated for the MsgA PUSCH (and/or Msg3) in the wireless communication system supporting Release 16 and/or lower. That is, the number of bits allocated for the MsgA PUSCH in Scenario #2 according to various embodiments may be greater than the number of bits allocated for the MsgA PUSCH in the wireless communication system supporting Release 16 and/or lower. At least some bits among the bits allocated for the MsgA PUSCH may be used to transmit positioning measurement results.

Scenario #2 according to various embodiments may be a scenario in which the UE transmits a measurement result for positioning to the BS/server/LMF with additionally allocated bits in addition to the bits allocated for the MsgA PUSCH.

According to various embodiments, additional bits may be allocated as follows: (Method 1) a method in which the MsgA PUSCH is transmitted by allocating additional bits only when the random access procedure is performed for positioning measurement; and (Method 2) a method in which bits to be used for positioning measurement are always included as basic transmission information for the MsgA PUSCH.

Method 1: Configuration of Additional Bits for Positioning Measurement

According to various embodiments, when the random access procedure is used for positioning measurement as described above, additional bits may be separately allocated to transmit the MsgA PUSCH.

According to various embodiments, if the total number of bits used to perform the RACH procedure due to beam failure recovery, system information request, handover, etc. is 56 and/or 72 bits for initial access, 56 or 72 bits+N bits (N>0) may be used in consideration of the case where the RACH procedure is performed for positioning according to method 1. Accordingly, the UE may use the 56 or 72 bits+N bits to transmit a measurement result over the MsgA PUSCH. For example, the measurement result may be mapped to the added N bits. Additionally/alternatively, the measurement result may be mapped to the 56 or 72 bits+N bits.

According to various embodiments, preambles may be divided into groups for each use. For example, preambles for positioning measurement (and/or preambles for positioning measurement and initial access) may be distinguished from preambles for initial access. For more details, reference may be made to Alt.1 of Case 1 according to various embodiments described above.

According to various embodiments, when the MsgA PUSCH includes information on a UE capability, positioning measurement, and/or a MO-LR request (and/or data/information for other purposes), bits may be defined to be used for each purpose and associated with preambles as described above.

For example, the size (and/or bits) of a reported payload may vary depending on each purpose, related data may be defined/configured depending on each purpose, and/or a preamble group corresponding/mapped to each purpose may be predefined/preconfigured. Each purpose may correspond to MO-LR request information, transfer capability, request assistance data, request location information, transfer location information, etc., but the various embodiments are not limited thereto.

According to various embodiments, the MsgA PUSCH may include only minimum information (e.g., UE identifier) for identifying the UE, and the remaining part (e.g., bits other than those to which the UE identifier is mapped) may include only the measurement result.

According to various embodiments, a specific RACH preamble/sequence may be allocated, and the specific RACH preamble/sequence may be used as the RACH preamble/sequence of the UE to perform a request for positioning measurement (for example, the positioning measurement request may include a request for PRS/SRS configurations). Additionally/alternatively, the specific RACH preamble/sequence may be used to select/determine PUSCH bits for reporting the positioning measurement over the MsgA PUSCH.

According to various embodiments, if the UE transmits a specific PRACH preamble to request a PosSIB, it may be interpreted to mean that the UE requests a PRS resource configuration that has not yet been configured. Additionally, according to various embodiments, there may be provided an operation in which the UE transmits a specific PRACH preamble to request transmission of a PRS that has already been configured but is not transmitted.

For example, there may be a case in which although PRS resources are configured, the BS transmits no PRS. For example, it may be assumed that PRS resources are configured, but the BS/location server/LMF turns off PRS transmission for the following reasons: network overhead/interference. According to various embodiments, in this case, the UE may transmit a PRACH preamble to request the PRS transmission (and/or turn on the PRS transmission). For example, an independent/dedicated PRACH preamble may be separately configured/indicated for the above UE operation.

Method 2: Configuration of Additional Bits for Reporting Measurements in Addition to Bits for MsgA PUSCH In Method 2 according to various embodiments, additional N bits may be applied in addition to X bits allocated for the MsgA PUSCH so that X+N bits may be redefined for the MsgA PUSCH, unlike Method 1 described above. For example, 56 or 72 bits+X bits may be defined as the bits for the MsgA PUSCH.

According to various embodiments, since the MsgA PUSCH is redefined, (available) bits to be used for positioning measurement may always be included as basic transmission information for the MsgA PUSCH. According to various embodiments, the number of information bits capable of being transmitted on the MsgA PUSCH may be understood as being extended and redefined, instead of defining additional bits for specific purposes.

In Method 2 according to various embodiments, since all UEs need to use the corresponding bits regardless of whether positioning measurement is performed, the limitation on the number of available bits may increase, compared to Method 1.

According to various embodiments, the UE may transmit only essential information, and/or the essential information may be configured/defined as a quantized value. For example, details of resolution related to quantization may be found in Method 1 described above.

For example, specific information corresponding to the essential information may be information about an RSTD.

For example, when the UE in the RRC connected state uses Q bits to report the corresponding value (e.g., RSTD) through a measurement report and/or when the UE uses the Q bits to report the result (e.g., RSTD), if the corresponding result is transmitted over the MsgA PUSCH, the result may be additionally transmitted with N bits smaller than the Q bits over the MsgA PUSCH.

According to various embodiments, specific information may be variably indicated/configured by the BS/server/LMF in system information and/or LPP message. The UE may transmit related results in the order of indication. The BS may interpret the information in the order of reception, thereby reducing bits required to identity the information from the UE. In other words, according to various embodiments, since the corresponding results are transmitted in the order of indication, it is not necessary to use a separate indicator to indicate the value of each result (and/or information corresponding to each result), thereby reducing the number of reported bits.

Hereinafter, common details will be described separately from the above-described scenarios according to various embodiments.

According to various embodiments, when the UE reports an RSTD, a UE Rx-Tx time difference, etc., the UE may use low resolution rather than legacy high resolution (e.g., for the RRC connected state), thereby using small bits compared to the legacy system. This may be, for example, to solve a problem that may occur when there is more data to be transmitted than a limited number of bits of the MsgA PUSCH.

According to various embodiments, an extra additional reporting table may be created separately from a high resolution quantization table, which is the reporting table for legacy timing (and/or positioning measurement).

According to various embodiments, the extra additional reporting table may be defined to be used only when timing measurements are reported over the MsgA PUSCH. According to various embodiments, the extra additional reporting table may be a low resolution quantization table.

An exemplary reporting table will be described. In the following, a reporting table for RSTD reporting will be described, but other reporting tables for reporting measurement values related to positioning such as a UE Rx-Tx time difference measurement may be separately defined/configured for each measurement value.

For example, regarding the above-described high resolution quantization table, the report range for DL RSTD measurements may be defined as resolution steps from $-985024 \times T_e$ to $985024 \times T_e$.

For example, the following relationship $k_{min} \le k \le k_{max}$ may be satisfied.

For example, the values of $k_{min}$ and $k_{max}$ may be different from each other. Depending on whether one or more PRS resources configured for both a reference cell and an adjacent cell measured for RSTD measurement are included in FR2 or whether one or more PRS resources configured for at least one of the reference cell and adjacent cell are included in FR1, the value of k may need to be greater than or equal to that configured by timingReportingGranularity-Factor.

For example, measurement report mapping for different k values may be defined/configured in a reporting table.

Table 16 shows an exemplary reporting table. The report table of Table 16 is for report mapping for reporting RSTD measurements when k=0, which may be an example of the high-resolution quantization table described above.

TABLE 16

| Reported Quantity Value, RSTD_i | Measured Quantity Value, RSTD | Unit |
|---|---|---|
| RSTD_0000000 | RSTD < −985024 | $T_c$ |
| RSTD_0000001 | −985024 ≤ RSTD < −985023 | $T_c$ |
| RSTD_0000002 | −985023 ≤ RSTD < −985022 | $T_c$ |
| ... | ... | ... |
| RSTD_0985024 | −1 ≤ RSTD < 0 | $T_c$ |
| RSTD_0985025 | 0 ≤ RSTD < 1 | $T_c$ |
| ... | ... | ... |
| RSTD_1970047 | 985022 ≤ RSTD < 985023 | $T_c$ |
| RSTD_1970048 | 985023 ≤ RSTD < 985024 | $T_c$ |
| RSTD_1970049 | 985024 ≤ RSTD | $T_c$ |

Referring to Table 16, measurement quantity values may be divided according to predetermined ranges, and a different reported quantity value may be assigned to each of the different ranges. For example, the measurement quantity values may be quantized based thereon, and thus the resolution may be Tc (k=0).

According to various embodiments, a low resolution quantization table may be defined/configured in addition to the above reporting table. For example, the measurement quantity values may be divided according to the predetermined ranges, and a different index (e.g., reported quantity value) may be assigned to each of the ranges. For example, the measurement quantity values may be quantized based thereon, and thus the resolution may be greater than Tc (k=0).

According to various embodiments, the BS/location server/LMF may limit a specific cell/BS/TRP for measurement reporting of the UE as described above. This may be, for example, to solve the above-mentioned problem (e.g., limited bits of the MsgA PUSCH).

For example, when it is configured/indicated that the RSTD is reported to the BS/location server/LMF for specific physical cells/BSs/TRPs #1, #2, and #3, the UE may report RSTD measurement information according to a specific rule without information on the physical cells/BSs/TRPs. According to various embodiments, the UE may recognize for which physical cell/BS/TRP each measurement is according to the specific rule.

According to various embodiments, the specific rule may be related to indicating that a measurement report related to a location service (LCS) is a result for another cell/TRP/BS rather than the originally configured/indicated cell/TRP/BS and/or identifying the cells/TRPs/BSs. For example, the UE may measure a cell/TRP/BS not directly configured/indicated by the BS/server/LMF (if constant) and report the result thereof. In this case, for example, the measurement report of the UE may include a physical cell ID and/or a global cell ID. However, whether the value corresponds to the cell/TRP/BS originally intended by the BS/server/LMF may be unclear. To prevent this issue, a factor/identifier indicating whether the measurement result is a result for the cell/TRP/BS originally intended by the BS/server/LMF (and/or directly configured/indicated by the BS/server/LMF) or a result for another cell/TRP/BS determined by the UE itself may be included in the measurement report of the UE. For example, the network may classify/identify the cells/TRPs/BSs based on the factor/identifier and use the measurement result for UE positioning. As another example, the location of a resource on which the measurement report for each TRP is reported/transmitted may vary. For example, the location of a resource to which the measurement for each TRP is mapped may be predetermined for each TRP, and the TRP corresponding to each measurement may be identified/recognized based on the resource location.

According to various embodiments, the UE may report/transmit top M (>0) best results among measurement results measured by the UE with a limited number of bits. For example, the top M (>0) measurements with good results may be determined from the measurement quality of each measurement result. For example, the above measurements may be M results corresponding to the top M values in descending order of measurement quality or M results corresponding to the top M values in ascending order of measurement quality.

Figure 18:
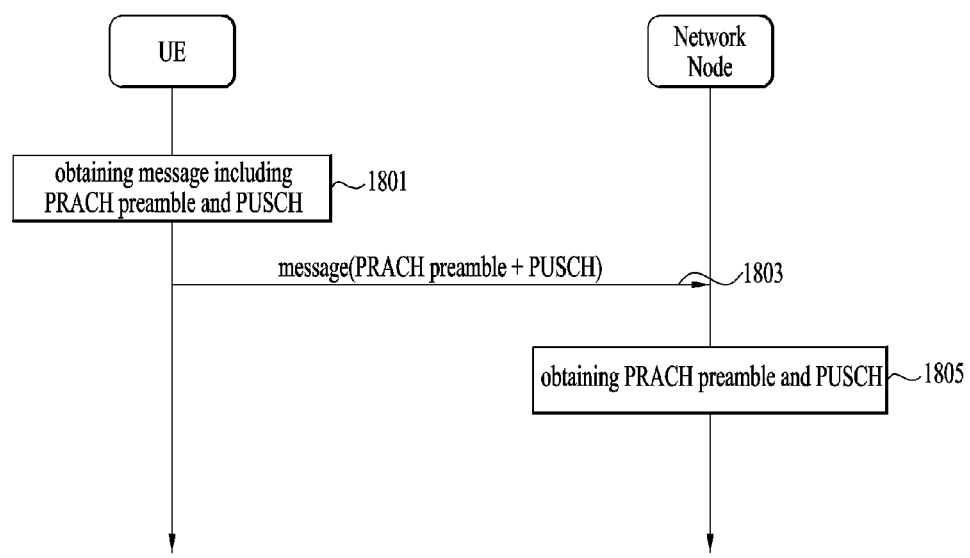
FIG. 18 is a diagram schematically illustrating a method of operating a UE and a network node according to various embodiments.

FIG. 18 is a diagram schematically illustrating a method of operating a UE and a network node according to various embodiments.

Figure 19:
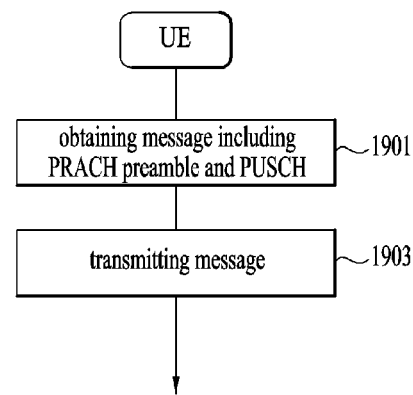
FIG. 19 is a flowchart illustrating a method of operating a UE according to various embodiments.

FIG. 19 is a flowchart illustrating a method of operating a UE according to various embodiments.

Figure 20:
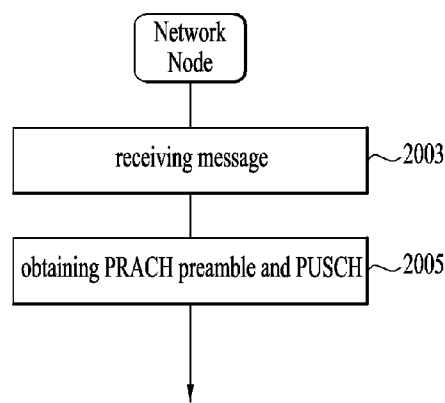
FIG. 20 is a flowchart illustrating a method of operating a network node according to various embodiments.

FIG. 20 is a flowchart illustrating a method of operating a network node according to various embodiments. For example, the network node may be a TP, a BS, a cell, a location server, an LMF, and/or any device performing the same role.

Referring to FIGS. 18 to 20, in operations 1801 and 1901 according to various embodiments, the UE may obtain/generate a message including a PRACH preamble and a PUSCH.

In operations 1803, 1903, and 2003 according to various embodiments, the UE may transmit the message, and the network node may receive/monitor the message.

In operations 1905 and 2005 according to various embodiments, the network node may acquire/decode the PRACH preamble and PUSCH based on the message.

According to various embodiments, the PRACH preamble may be included in one or more PRACH preambles configured for positioning.

For example, receiving/monitoring/obtaining/decoding the PRACH preamble and PUSCH may include not only successfully receiving/monitoring/obtaining/decoding the PRACH preamble and PUSCH but also failing to receive/monitor/obtain/decode at least one of the PRACH preamble and PUSCH and/or attempting to receive/monitor/obtain/decode at least one of the PRACH preamble and PUSCH.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments 4.1. Exemplary Configurations of Devices to which Various Embodiments are Applied FIG. 21 is a diagram illustrating a device that implements various embodiments.

Figure 21:
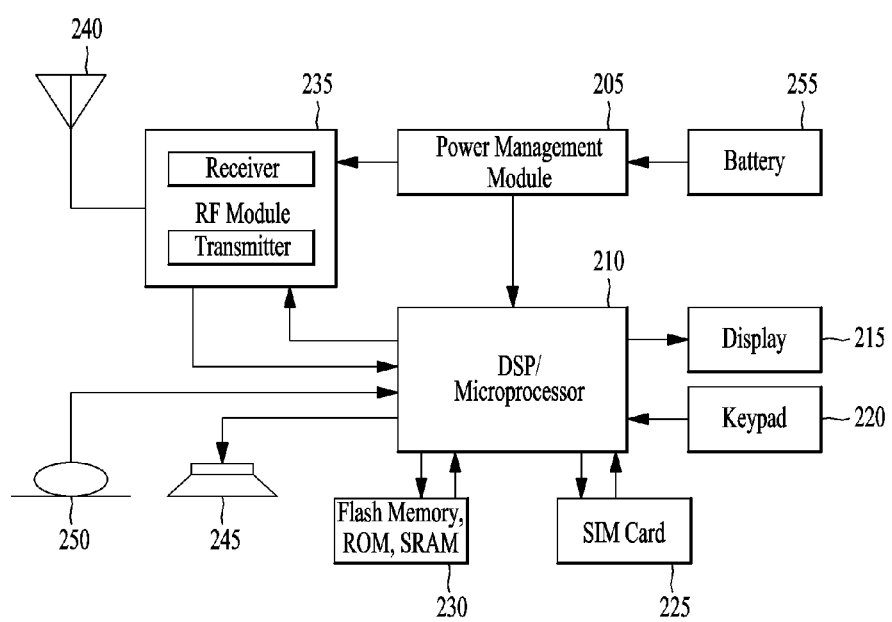
FIG. 21 is a block diagram illustrating an apparatus for implementing various embodiments.

The device illustrated in FIG. 21 may be a UE and/or a BS (e.g., eNB or gNB or TP) and/or a location server (or LMF) which is adapted to perform the above-described mechanism, or any device performing the same operation.

Referring to FIG. 21, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 19 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 21 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the at least one processor included in the UE (or the at least one processor of the communication device included in the UE) may obtain/generate a message including a PRACH preamble and a PUSCH.

According to various embodiments, the at least one processor included in the UE may transmit the message.

According to various embodiments, the PRACH preamble may be included in one or more PRACH preambles configured for positioning.

According to various embodiments, the one or more PRACH preambles may be a plurality of PRACH preambles configured for the positioning.

According to various embodiments, the plurality of PRACH preambles may be distributed into a plurality of groups.

According to various embodiments, the plurality of groups may be respectively related to different IEs for LPP messages for the positioning.

According to various embodiments, the IEs may include: (i) a first IE related to an LPP capability of the apparatus; (ii) a second IE related to requesting assistance data for the positioning; and (iii) a third IE related to providing one or more measurements for the positioning.

According to various embodiments, the UE may be in an RRC idle or RRC inactive state.

According to various embodiments, based on the PRACH preamble being included in a group related to the third IE among the plurality of groups, the PUSCH may include information related to the one or more measurements.

According to various embodiments, the information related to the one or more measurements may include information based on a reporting range defined by first resolution predetermined for the RRC idle or RRC inactive state within a predetermined range.

According to various embodiments, the first resolution may be greater than second resolution preconfigured for an RRC connected state.

According to various embodiments, the at least one processor included in the UE may receive information related to a number of total PRACH preambles available for a contention-based random access procedure and a contention-free random access procedure.

According to various embodiments, at least one of the following may be satisfied: (i) based on reception of information related to a number of one or more PRACH preambles configured for the positioning among the total PRACH preambles, obtaining as many PRACH preambles as the number of the one or more PRACH preambles configured for the positioning among the total PRACH preambles as the one or more PRACH preambles; or (ii) based on reception of information related to a number of one or more PRACH preambles configured for the positioning among PRACH preambles available for other purposes except for the total PRACH preambles, obtaining as many PRACH preambles as the number of the one or more PRACH preambles configured for the positioning among the PRACH preambles available for the other purposes as the one or more PRACH preambles.

According to various embodiments, the at least one processor included in the UE may monitor a PRS related to the positioning within a time duration configured based on system information.

According to various embodiments, the at least one processor included in the UE may transmit/retransmit the PRACH preamble when failing to monitor the PRS within the time duration.

According to various embodiments, the PRACH preamble may be transmitted on one or more PRACH occasions among a plurality of PRACH occasions.

According to various embodiments, the PUSCH may be transmitted on one or more PUSCH occasions among a plurality of PUSCH occasions.

According to various embodiments, the one or more PUSCH occasions may be located after the one or more PRACH occasions in a time domain.

According to various embodiments, based on the PRS being monitored between the one or more PRACH occasions and the one or more PUSCH occasions in the time domain, the PUSCH may include information related to one or more measurements for the positioning based on the PRS.

According to various embodiments, at least one processor included in a network node (or at least one processor of a communication device included in the network node) may receive a message including a PRACH preamble and a PUSCH.

According to various embodiments, the at least one processor included in the network node may obtain the PRACH preamble and the PUSCH based on the message.

According to various embodiments, the PRACH preamble may be included in one or more PRACH preambles configured for positioning.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied

In the present specification, various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
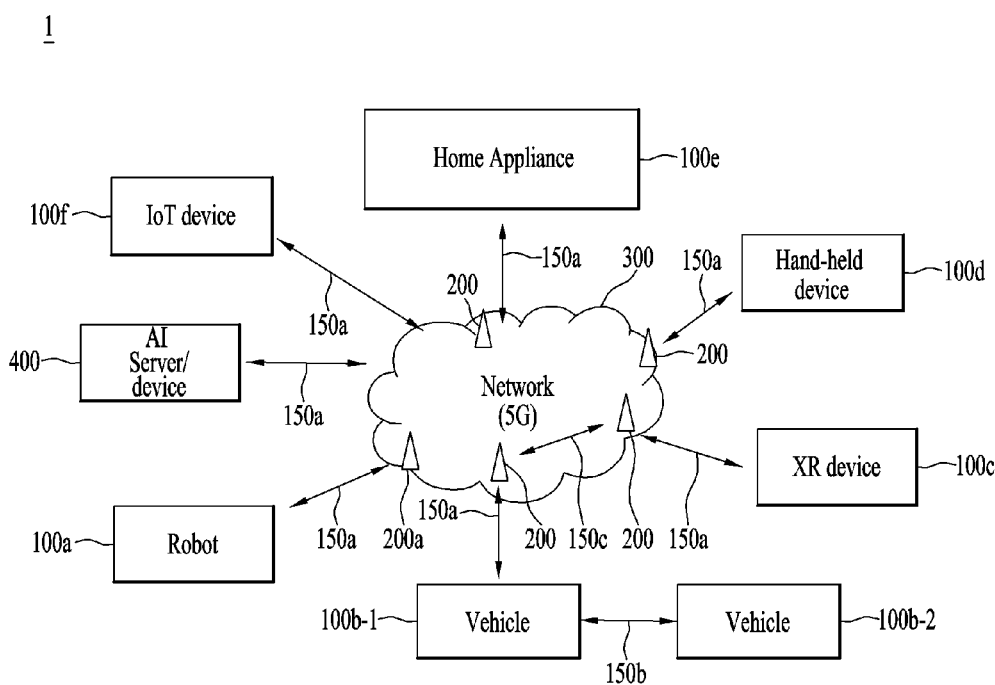
FIG. 22 illustrates an exemplary communication system to which various embodiments are applied.

FIG. 22 illustrates an exemplary communication system to which various embodiments are applied.

Referring to FIG. 22, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AL server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Devices to which Various Embodiments are Applied

Figure 23:
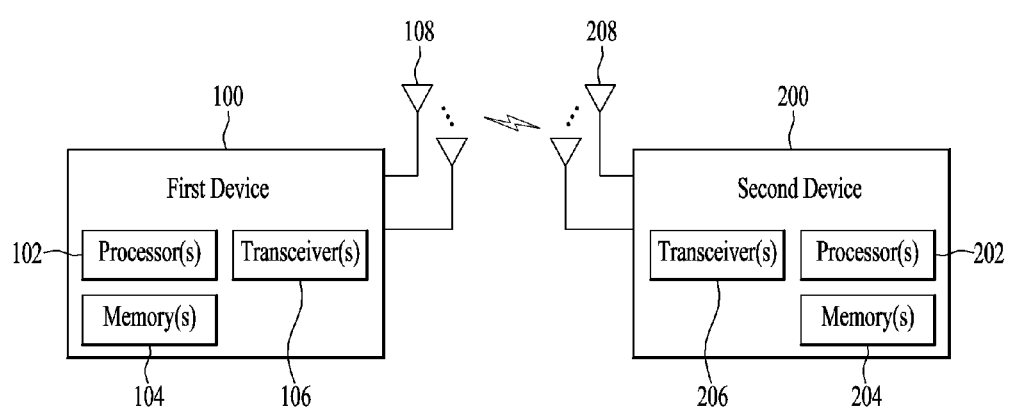
FIG. 23 illustrates exemplary wireless devices to which various embodiments are applicable.

FIG. 23 illustrates exemplary wireless devices to which various embodiments are applicable.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations of the various embodiments.

According to various embodiments, a computer-readable storage medium may store one or more instructions or computer programs which, when executed by one or more processors, cause the one or more processors to perform operations according to various embodiments or implementations of the various embodiments.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the various embodiments.

Example of Using Wireless Devices to which Various Embodiments are Applied

Figure 24:
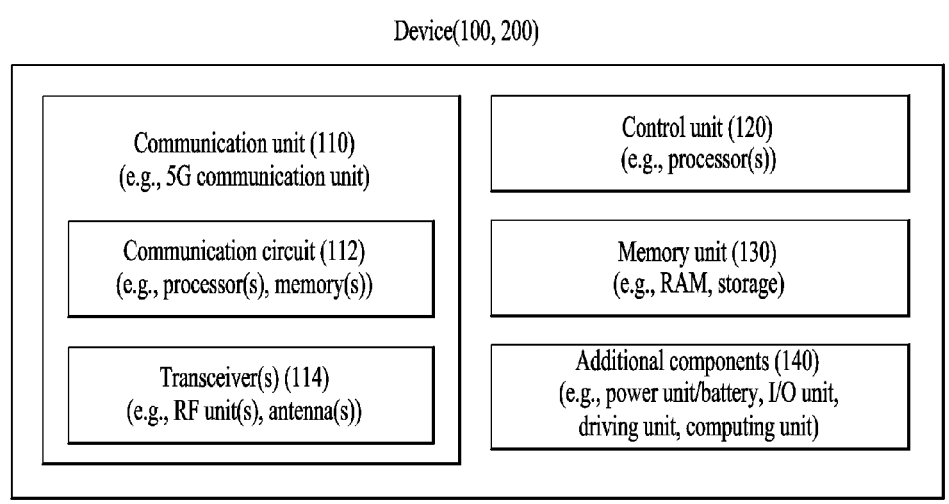
FIG. 24 illustrates other exemplary wireless devices to which various embodiments are applied.

FIG. 24 illustrates other exemplary wireless devices to which various embodiments are applied. The wireless devices may be implemented in various forms according to a use case/service (see FIG. 22).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Example of Portable Device to which Various Embodiments are Applied

Figure 25:
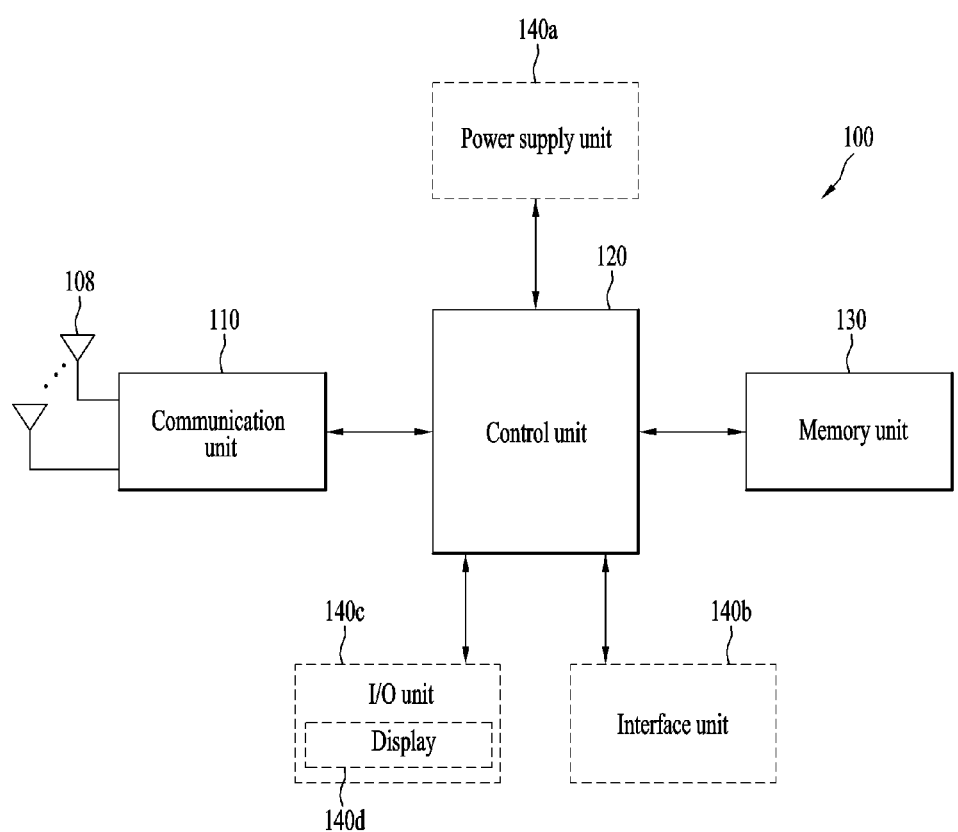
FIG. 25 illustrates an exemplary portable device to which various embodiments are applied.

FIG. 25 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which Various Embodiments.

Figure 26:
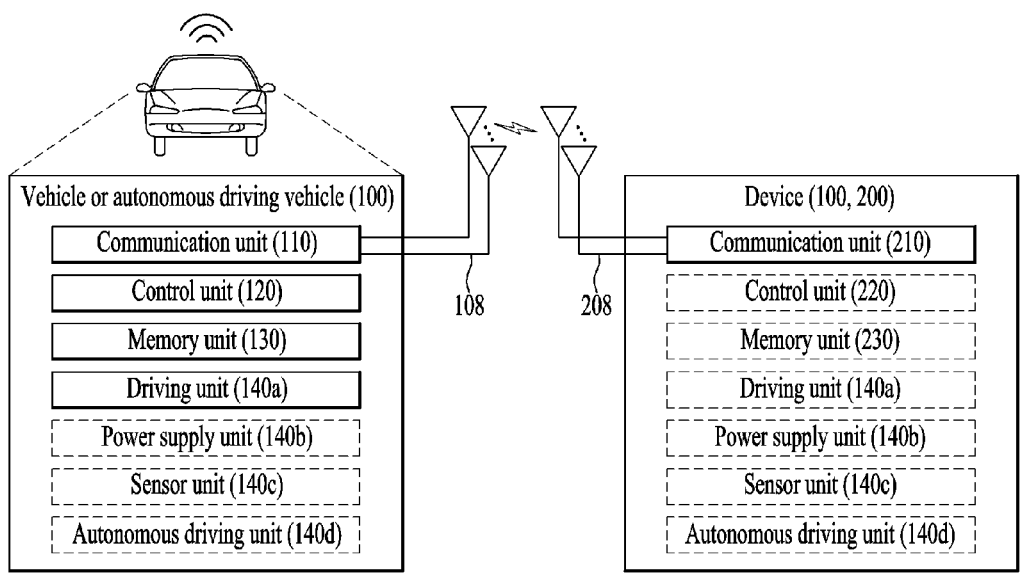
FIG. 26 illustrates an exemplary vehicle or autonomous driving vehicle to which various embodiments.

FIG. 26 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by an apparatus in a wireless communication system, the method comprising:
obtaining a message including a physical random access channel (PRACH) preamble and a physical uplink shared channel (PUSCH); and
transmitting the message,
wherein the PRACH preamble is included in a plurality of PRACH preambles configured for positioning,
wherein the plurality of PRACH preambles are distributed into a plurality of groups, and
wherein the plurality of groups are respectively related to different information elements (IEs) for a long-term evolution positioning protocol (LPP) message for the positioning.

2. The method of claim 1, wherein the different IEs comprise:
(i) a first IE related to an LPP capability of the apparatus;
(ii) a second IE related to requesting assistance data for the positioning; and (iii) a third IE related to providing one or more measurements for the positioning.

3. The method of claim 2, wherein the apparatus is in a radio resource control (RRC) idle or RRC inactive state,
wherein based on the PRACH preamble being included in a group related to the third IE among the plurality of groups, the PUSCH includes information related to the one or more measurements,
wherein the information related to the one or more measurements includes information based on a reporting range defined by a first resolution preconfigured for the RRC idle or RRC inactive state within a predetermined range, and
wherein the first resolution is greater than a second resolution preconfigured for an RRC connected state.

4. The method of claim 1, wherein information related to a number of total PRACH preambles available for a contention-based random access procedure and a contention-free random access procedure is received, and
wherein at least one of the following is satisfied:
based on reception of information related to a number of one or more PRACH preambles configured for the positioning among the total PRACH preambles, obtaining as many PRACH preambles as the number of the one or more PRACH preambles configured for the positioning among the total PRACH preambles as the one or more PRACH preambles; or
based on reception of information related to a number of one or more PRACH preambles configured for the positioning among PRACH preambles available for other purposes except for the total PRACH preambles, obtaining as many PRACH preambles as the number of the one or more PRACH preambles configured for the positioning among the PRACH preambles available for the other purposes as the one or more PRACH preambles.

5. The method of claim 1, further comprising monitoring a positioning reference signal (PRS) related to the positioning within a time duration configured based on system information,
wherein based on failure in monitoring the PRS within the time duration, the PRACH preamble is retransmitted.

6. The method of claim 5, wherein the PRACH preamble is transmitted on one or more PRACH occasions among a plurality of PRACH occasions,
wherein the PUSCH is transmitted on one or more PUSCH occasions among a plurality of PUSCH occasions,
wherein the one or more PUSCH occasions are located after the one or more PRACH occasions in a time domain, and
wherein based on the PRS being monitored between the one or more PRACH occasions and the one or more PUSCH occasions in the time domain, the PUSCH includes information related to one or more measurements for the positioning based on the PRS.

7. A user equipment (UE) configured to operate in a wireless communication system, the UE comprising:
a transceiver; and
one or more processors connected to the transceiver,
wherein the one or more processors are configured to:
obtain a message including a physical random access channel (PRACH) preamble and a physical uplink shared channel (PUSCH); and
transmit the message, and
wherein the PRACH preamble is included in a plurality of PRACH preambles configured for positioning,
wherein the plurality of PRACH preambles are distributed into a plurality of groups, and
wherein the plurality of groups are respectively related to different information elements (IEs) for a long-term evolution positioning protocol (LPP) message for the positioning.

8. The UE of claim 7, wherein the different IEs comprise:
(i) a first IE related to an LPP capability of the UE;
(ii) a second IE related to requesting assistance data for the positioning; and
(iii) a third IE related to providing one or more measurements for the positioning.

9. The UE of claim 7, wherein the one or more processors are configured to communicate with at least one of a mobile terminal, a network, or an autonomous driving vehicle other than a vehicle including the UE.

10. A method performed by an apparatus in a wireless communication system, the method comprising:
receiving a message including a physical random access channel (PRACH) preamble and a physical uplink shared channel (PUSCH); and
obtaining the PRACH preamble and the PUSCH based on the message,
wherein the PRACH preamble is included in a plurality of PRACH preambles configured for positioning,
wherein the plurality of PRACH preambles are distributed into a plurality of groups, and
wherein the plurality of groups are respectively related to different information elements (IEs) for a long-term evolution positioning protocol (LPP) message for the positioning.

11. A base station configured to operate in a wireless communication system, the base station comprising:
a transceiver; and
one or more processors connected to the transceiver,
wherein the one or more processors are configured to:
receive a message including a physical random access channel (PRACH) preamble and a physical uplink shared channel (PUSCH); and
obtain the PRACH preamble and the PUSCH based on the message,
wherein the PRACH preamble is included in a plurality of PRACH preambles configured for positioning,
wherein the plurality of PRACH preambles are distributed into a plurality of groups, and
wherein the plurality of groups are respectively related to different information elements (IEs) for a long-term evolution positioning protocol (LPP) message for the positioning.

* * * * *